US007792719B2

(12) United States Patent
Arnott

(10) Patent No.: US 7,792,719 B2
(45) Date of Patent: Sep. 7, 2010

(54) VALUATION INDIFFERENT NON-CAPITALIZATION WEIGHTED INDEX AND PORTFOLIO

(75) Inventor: Robert D. Arnott, Pasadena, CA (US)

(73) Assignee: Research Affiliates, LLC, Newport Beach, CA (US)

( * ) Notice: Subject to any disclaimer, the term of this patent is extended or adjusted under 35 U.S.C. 154(b) by 848 days.

(21) Appl. No.: 10/961,404

(22) Filed: Oct. 12, 2004

(65) Prior Publication Data

US 2005/0171884 A1 Aug. 4, 2005

Related U.S. Application Data

(60) Provisional application No. 60/541,733, filed on Feb. 4, 2004.

(51) Int. Cl.
*G06Q 40/00* (2006.01)
(52) U.S. Cl. .................... 705/35; 705/36 R; 705/37
(58) Field of Classification Search .............. 705/35, 705/36, 36 R
See application file for complete search history.

(56) References Cited

U.S. PATENT DOCUMENTS

| 4,334,270 | A | 6/1982 | Towers |
| 4,871,177 | A | 10/1989 | Mock |
| 4,933,842 | A | 6/1990 | Durbin et al. |
| 4,974,983 | A | 12/1990 | Givati et al. |
| 5,101,353 | A | 3/1992 | Lupien et al. |
| 5,126,936 | A | 6/1992 | Champion et al. |
| 5,132,899 | A | 7/1992 | Fox |
| 5,193,056 | A | 3/1993 | Boes |
| 5,414,838 | A | 5/1995 | Kolton et al. |
| 5,590,325 | A | 12/1996 | Kolton et al. |
| 5,592,379 | A | 1/1997 | Finfrock et al. |
| 5,644,727 | A | 7/1997 | Atkins |
| 5,745,706 | A | 4/1998 | Wolfberg et al. |
| 5,761,442 | A | * 6/1998 | Barr et al. .................. 705/36 R |
| 5,778,357 | A | 7/1998 | Kolton et al. |

(Continued)

FOREIGN PATENT DOCUMENTS

EP 1351179 A1 10/2003

(Continued)

OTHER PUBLICATIONS

Business Wire, Investment-Technlgies; (IVES) Jan. 6, 1989, p. 1.*

(Continued)

*Primary Examiner*—Alexander Kalinowski
*Assistant Examiner*—Gregory Johnson
(74) *Attorney, Agent, or Firm*—Albrecht Tousi & Farnum PLLC; Ralph P. Albrecht; Cameron H. Tousi

(57) ABSTRACT

A passive investment system based on indices created from various metrics is disclosed. The indexes may be built by selecting and weighting securities by an objective measure of scale such as accounting metrics rather than market capitalization weighting, price weighting or equal weighting. Various financial, accounting, and non-financial metrics may be used to build an index. Additionally, a combination of financial non-market capitalization metrics may be used along with non-financial metrics to create passive investment systems. Once the index is built, it may be used as a basis to purchase securities for a portfolio.

88 Claims, 3 Drawing Sheets

U.S. PATENT DOCUMENTS

| | | |
|---|---|---|
| 5,806,048 A | 9/1998 | Kiron |
| 5,812,987 A | 9/1998 | Luskin et al. |
| 5,812,988 A | 9/1998 | Sandretto |
| 5,819,238 A * | 10/1998 | Fernholz .................... 705/36 R |
| 5,819,263 A | 10/1998 | Bromley et al. |
| 5,875,437 A | 2/1999 | Atkins |
| 5,878,405 A | 3/1999 | Grant et al. |
| 5,911,135 A | 6/1999 | Atkins |
| 5,918,217 A | 6/1999 | Maggioncalda et al. |
| 5,926,792 A | 7/1999 | Koppes et al. |
| 5,930,774 A | 7/1999 | Chennault |
| 5,946,666 A | 8/1999 | Nevo et al. |
| 5,946,667 A | 8/1999 | Tull, Jr. et al. |
| 5,978,778 A | 11/1999 | O'Shaughnessy |
| 5,987,433 A | 11/1999 | Crapo |
| 6,003,018 A | 12/1999 | Michaud et al. |
| 6,012,043 A | 1/2000 | Albright et al. |
| 6,012,044 A | 1/2000 | Maggioncalda et al. |
| 6,018,722 A | 1/2000 | Ray et al. |
| 6,021,397 A | 2/2000 | Jones et al. |
| 6,049,772 A | 4/2000 | Payne et al. |
| 6,052,673 A | 4/2000 | Leon et al. |
| 6,061,663 A | 5/2000 | Bloom et al. |
| 6,064,985 A | 5/2000 | Anderson |
| 6,073,116 A | 6/2000 | Boyle |
| 6,078,904 A | 6/2000 | Rebane |
| 6,088,685 A | 7/2000 | Kiron |
| 6,092,056 A | 7/2000 | Tull, Jr. et al. |
| 6,115,697 A | 9/2000 | Gottstein et al. |
| 6,134,535 A | 10/2000 | Belzberg et al. |
| 6,154,732 A | 11/2000 | Tarbox |
| 6,161,098 A | 12/2000 | Wallman |
| 6,175,824 B1 | 1/2001 | Breitzman et al. |
| 6,233,566 B1 | 5/2001 | Levine et al. |
| 6,240,399 B1 | 5/2001 | Frank et al. |
| 6,272,474 B1 | 8/2001 | Garcia |
| 6,292,787 B1 | 9/2001 | Scott et al. |
| 6,317,700 B1 | 11/2001 | Bagne |
| 6,317,726 B1 | 11/2001 | O'Shaughnessy |
| 6,336,103 B1 | 1/2002 | Baker |
| 6,338,047 B1 | 1/2002 | Wallman |
| 6,338,067 B1 | 1/2002 | Baker et al. |
| 6,377,963 B1 | 4/2002 | Walker et al. |
| 6,393,409 B2 | 5/2002 | Young et al. |
| 6,405,204 B1 | 6/2002 | Baker et al. |
| 6,456,982 B1 | 9/2002 | Pilipovic |
| 6,484,151 B1 | 11/2002 | O'Shaughnessy |
| 6,484,152 B1 | 11/2002 | Robinson |
| 6,598,028 B1 | 7/2003 | Sullivan et al. |
| 6,601,044 B1 | 7/2003 | Wallman |
| 6,622,129 B1 | 9/2003 | Whitworth |
| 6,839,685 B1 | 1/2005 | Leistensnider et al. |
| 6,859,785 B2 | 2/2005 | Case |
| 6,876,981 B1 | 4/2005 | Berckmans |
| 6,879,964 B2 | 4/2005 | Sauter et al. |
| 6,901,383 B1 | 5/2005 | Ricketts et al. |
| 6,938,009 B1 | 8/2005 | Herbst et al. |
| 6,947,901 B1 | 9/2005 | McCabe et al. |
| 6,985,880 B1 | 1/2006 | Hodgdon et al. |
| 7,024,388 B2 | 4/2006 | Stefek et al. |
| 7,031,937 B2 | 4/2006 | Brown |
| 7,035,820 B2 | 4/2006 | Goodwin et al. |
| 7,076,461 B2 | 7/2006 | Balabon |
| 7,085,738 B2 | 8/2006 | Tarrant |
| 7,089,191 B2 | 8/2006 | Baron et al. |
| 7,089,202 B1 | 8/2006 | McNamar et al. |
| 7,089,205 B1 | 8/2006 | Abernethy |
| 7,092,857 B1 | 8/2006 | Steiner et al. |
| 7,099,838 B1 | 8/2006 | Gastineau et al. |
| 7,107,229 B1 | 9/2006 | Sullivan |
| 7,117,175 B2 | 10/2006 | Arnott |
| 7,127,423 B2 | 10/2006 | Dunning et al. |
| 7,155,468 B2 | 12/2006 | Weiss |
| 7,194,468 B1 | 3/2007 | Bacila et al. |
| 7,222,095 B2 | 5/2007 | Squyres |
| 7,249,086 B2 | 7/2007 | Bloom et al. |
| 7,272,578 B1 | 9/2007 | Leistensnider et al. |
| 7,295,987 B2 | 11/2007 | Graff |
| 7,299,205 B2 * | 11/2007 | Weinberger ................ 705/36 R |
| 7,353,115 B2 | 4/2008 | Bertogg |
| 7,353,198 B2 | 4/2008 | Rios |
| 7,395,236 B2 | 7/2008 | Degraaf et al. |
| 7,418,419 B2 | 8/2008 | Squyres |
| 7,421,405 B2 | 9/2008 | Little |
| 7,444,300 B1 | 10/2008 | Broms et al. |
| 7,496,531 B1 | 2/2009 | Gastineau et al. |
| 7,509,278 B2 | 3/2009 | Jones |
| 7,587,352 B2 | 9/2009 | Arnott |
| 7,620,577 B2 | 11/2009 | Arnott |
| 7,664,694 B2 | 2/2010 | Brandhorst |
| 7,685,069 B1 | 3/2010 | Subramanian |
| 7,698,192 B2 | 4/2010 | Kiron |
| 2001/0025266 A1 | 9/2001 | Gastineau et al. |
| 2001/0037212 A1 | 11/2001 | Motosuna et al. |
| 2001/0039526 A1 | 11/2001 | Pittenger |
| 2002/0007329 A1 | 1/2002 | Alcaly et al. |
| 2002/0013755 A1 | 1/2002 | Kiron |
| 2002/0023035 A1 | 2/2002 | Kiron |
| 2002/0032629 A1 | 3/2002 | Siegel et al. |
| 2002/0038271 A1 | 3/2002 | Friend et al. |
| 2002/0046038 A1 | 4/2002 | Prokoski |
| 2002/0052820 A1 | 5/2002 | Gatto |
| 2002/0059126 A1 | 5/2002 | Ricciardi |
| 2002/0059127 A1 | 5/2002 | Brown et al. |
| 2002/0062272 A1 | 5/2002 | Kim et al. |
| 2002/0116211 A1 | 8/2002 | Hatakeyama |
| 2002/0116310 A1 | 8/2002 | Cohen et al. |
| 2002/0116311 A1 | 8/2002 | Chalke et al. |
| 2002/0120570 A1 | 8/2002 | Loy |
| 2002/0123952 A1 | 9/2002 | Lipper |
| 2002/0128947 A1 | 9/2002 | Sauter et al. |
| 2002/0128951 A1 | 9/2002 | Kiron |
| 2002/0133447 A1 * | 9/2002 | Mastman .................... 705/36 |
| 2002/0143676 A1 | 10/2002 | Kiron |
| 2002/0156713 A1 | 10/2002 | Gaini |
| 2002/0161684 A1 | 10/2002 | Whitworth |
| 2002/0173998 A1 | 11/2002 | Case |
| 2002/0178039 A1 | 11/2002 | Kennedy |
| 2002/0184126 A1 * | 12/2002 | McIntyre et al. ............... 705/35 |
| 2003/0014343 A1 | 1/2003 | Jones |
| 2003/0018556 A1 * | 1/2003 | Squyres .................... 705/36 |
| 2003/0018563 A1 | 1/2003 | Kilgour et al. |
| 2003/0018570 A1 | 1/2003 | McCabe |
| 2003/0065600 A1 | 4/2003 | Terashima et al. |
| 2003/0065602 A1 | 4/2003 | Yip |
| 2003/0074293 A1 | 4/2003 | Kiron |
| 2003/0074295 A1 | 4/2003 | Little |
| 2003/0074306 A1 | 4/2003 | Rios |
| 2003/0093352 A1 | 5/2003 | Muralidhar et al. |
| 2003/0105697 A1 | 6/2003 | Griffin et al. |
| 2003/0120577 A1 | 6/2003 | Sakui et al. |
| 2003/0120578 A1 * | 6/2003 | Newman .................... 705/36 |
| 2003/0144947 A1 | 7/2003 | Payne |
| 2003/0172026 A1 | 9/2003 | Tarrant |
| 2003/0182219 A1 | 9/2003 | Bodurtha et al. |
| 2003/0212621 A1 | 11/2003 | Poulter et al. |
| 2003/0225657 A1 | 12/2003 | Whaley et al. |
| 2003/0225658 A1 | 12/2003 | Whaley |
| 2003/0229555 A1 * | 12/2003 | Marlowe-Noren .......... 705/35 |
| 2004/0024671 A1 * | 2/2004 | Freund ....................... 705/35 |
| 2004/0039620 A1 | 2/2004 | Ando et al. |
| 2004/0044505 A1 | 3/2004 | Horwitz |
| 2004/0068456 A1 | 4/2004 | Korisch |
| 2004/0111352 A1 * | 6/2004 | Kim ............................ 705/36 |

| | | |
|---|---|---|
| 2004/0117284 A1 | 6/2004 | Speth |
| 2004/0133497 A1* | 7/2004 | Spear .......................... 705/36 |
| 2004/0167847 A1 | 8/2004 | Nathan |
| 2004/0181477 A1* | 9/2004 | Sauter et al. ................... 705/36 |
| 2004/0193528 A1 | 9/2004 | Sadre |
| 2004/0210504 A1* | 10/2004 | Rutman ....................... 705/37 |
| 2004/0225536 A1 | 11/2004 | Schoen et al. |
| 2004/0236661 A1 | 11/2004 | Benning |
| 2004/0254871 A1 | 12/2004 | Weiss |
| 2004/0267657 A1 | 12/2004 | Hecht |
| 2005/0010481 A1 | 1/2005 | Lutnick et al. |
| 2005/0015326 A1 | 1/2005 | Terry |
| 2005/0038725 A1 | 2/2005 | Boyle et al. |
| 2005/0049948 A1* | 3/2005 | Fuscone ...................... 705/35 |
| 2005/0049952 A1* | 3/2005 | Carter .......................... 705/36 |
| 2005/0060254 A1 | 3/2005 | Jones |
| 2005/0108043 A1 | 5/2005 | Davidson |
| 2005/0108148 A1 | 5/2005 | Carlson |
| 2005/0114169 A1 | 5/2005 | Ansari |
| 2005/0114251 A1 | 5/2005 | Sperandeo |
| 2005/0144107 A1 | 6/2005 | Plonski |
| 2005/0149422 A1 | 7/2005 | Van Lier |
| 2005/0171884 A1 | 8/2005 | Arnott |
| 2005/0171894 A1 | 8/2005 | Traynor |
| 2005/0192889 A1 | 9/2005 | Sauter et al. |
| 2005/0216407 A1 | 9/2005 | Feldman et al. |
| 2005/0222941 A1 | 10/2005 | Tull |
| 2005/0246255 A1 | 11/2005 | Rousseau |
| 2006/0015433 A1 | 1/2006 | Arnott et al. |
| 2006/0041489 A1 | 2/2006 | Arnott |
| 2006/0059074 A1 | 3/2006 | Freund |
| 2006/0064364 A1 | 3/2006 | Whitehead |
| 2006/0074787 A1 | 4/2006 | Perg et al. |
| 2006/0100946 A1 | 5/2006 | Kazarian |
| 2006/0100949 A1 | 5/2006 | Whaley et al. |
| 2006/0100950 A1 | 5/2006 | Hecht |
| 2006/0100955 A1 | 5/2006 | Baldassini et al. |
| 2006/0149645 A1 | 7/2006 | Wood |
| 2006/0161489 A1 | 7/2006 | Allen et al. |
| 2006/0184438 A1 | 8/2006 | McDow |
| 2006/0184444 A1 | 8/2006 | McConaughy et al. |
| 2006/0200395 A1 | 9/2006 | Masuyama |
| 2006/0206398 A1 | 9/2006 | Coughlin |
| 2006/0206405 A1 | 9/2006 | Gambill |
| 2006/0212384 A1 | 9/2006 | Spurgin et al. |
| 2006/0218075 A1 | 9/2006 | Feldman et al. |
| 2006/0224487 A1 | 10/2006 | Galdi |
| 2006/0224494 A1 | 10/2006 | Pinkava |
| 2006/0247996 A1 | 11/2006 | Feldman |
| 2006/0253363 A1 | 11/2006 | Tarrant |
| 2007/0005471 A1 | 1/2007 | Ho et al. |
| 2007/0005476 A1 | 1/2007 | Ho et al. |
| 2007/0016497 A1 | 1/2007 | Shalen et al. |
| 2007/0022033 A1 | 1/2007 | Ho et al. |
| 2007/0027790 A1 | 2/2007 | Gastineau et al. |
| 2007/0043644 A1 | 2/2007 | Weiss |
| 2007/0043650 A1 | 2/2007 | Hughes et al. |
| 2007/0055598 A1 | 3/2007 | Arnott et al. |
| 2007/0055599 A1 | 3/2007 | Arnott |
| 2007/0061235 A1 | 3/2007 | Timmons et al. |
| 2007/0112662 A1 | 5/2007 | Kumar |
| 2007/0174102 A1 | 7/2007 | Coulter |
| 2007/0179874 A1 | 8/2007 | Spirgel et al. |
| 2007/0198389 A1 | 8/2007 | Orloske et al. |
| 2007/0239583 A1 | 10/2007 | Williams |
| 2007/0244787 A1 | 10/2007 | Lowry |
| 2007/0288339 A1 | 12/2007 | Squyres |
| 2008/0071699 A1 | 3/2008 | Catalano-Johnson |
| 2008/0071700 A1 | 3/2008 | Catalano-Johnson |
| 2008/0140547 A1 | 6/2008 | Murphy et al. |
| 2008/0208769 A1 | 8/2008 | Beer |
| 2008/0215502 A1 | 9/2008 | Sabbia |
| 2008/0235121 A1 | 9/2008 | Gonen |
| 2008/0243717 A1 | 10/2008 | Rios |
| 2008/0243721 A1 | 10/2008 | Joao |
| 2008/0249957 A1 | 10/2008 | Masuyama |
| 2008/0270317 A1 | 10/2008 | Waldron |
| 2008/0288416 A1 | 11/2008 | Arnott |
| 2008/0294539 A1 | 11/2008 | Bassuk |
| 2009/0006267 A1 | 1/2009 | Fergusson et al. |
| 2009/0018966 A1 | 1/2009 | Clark |
| 2009/0063363 A1 | 3/2009 | Present et al. |
| 2009/0164388 A1 | 6/2009 | Jones |
| 2009/0182683 A1 | 7/2009 | Taylor |
| 2009/0198631 A1 | 8/2009 | McGarel |
| 2010/0063942 A1 | 3/2010 | Arnott |

FOREIGN PATENT DOCUMENTS

| | | |
|---|---|---|
| GB | 2393532 | 3/2004 |
| GB | 2419011 A | 4/2006 |
| JP | 2001249962 A | 9/2001 |
| JP | 20010249962 | 9/2001 |
| JP | 2002-502514 | 1/2002 |
| JP | 2002-512405 | 4/2002 |
| JP | 2003-044664 | 2/2003 |
| JP | 2003-150779 | 5/2003 |
| JP | 2004259156 A | 9/2004 |
| WO | WO 96/06402 A2 | 2/1996 |
| WO | WO-98/44444 | 10/1998 |
| WO | WO-99/23592 A1 | 5/1999 |
| WO | WO-00/16226 A1 | 3/2000 |
| WO | WO 01/33402 A2 | 5/2001 |
| WO | WO 01/37168 A2 | 5/2001 |
| WO | WO 01/39005 A2 | 5/2001 |
| WO | WO-01/46846 | 6/2001 |
| WO | WO-01/48629 A1 | 7/2001 |
| WO | WO 02/093322 | 11/2002 |
| WO | WO 02/095639 | 11/2002 |
| WO | WO 03/009094 | 1/2003 |
| WO | WO03/032206 | 4/2003 |
| WO | WO-03/034180 A2 | 4/2003 |
| WO | WO 2006/089565 A2 | 8/2006 |
| WO | WO-2006101764 A1 | 9/2006 |
| WO | WO 2006/103474 A2 | 10/2006 |
| WO | WO-2007/027200 A2 | 3/2007 |

OTHER PUBLICATIONS

John D. Bazley, Financial Accounting Concepts and Uses, PWS-Kent Publishing Company, 1988, p. 4.*
Diversity-Weighted Indexing, Robert Femholz, Journal of Portfolio Management, Winter 1998, pp. 74-82.*
Investing at the edge (investing in non-capitalization weighted index funds), Jarrod W Wilcox, Journal of Portfolio Management, New York, Spring 1998,vol. 24, Iss. 3; 16 pgs.*
International Search Report and Written Opinion of the International Searching Authority mailed Dec. 19, 2006, from related application PCT/US05/02345.
Office Action issued Jan. 26, 2010 in related Israel Appl. No. 172792 (with English translation).
Office Action issued Sep. 10, 2009 in related Mexican Appl. No. PA/a/2006/000103 (English translation only).
Office Action issued Oct. 28, 2009 in related Australian Appl. No. 2005213293.
International Search Report issued in related PCT/US2005/002345 mailed Dec. 19, 2006.
Kalotay, Andrew J. et al., "A Model for Valuing Bonds and Embedded Options," Financial Analysts Journal, May-Jun. 1993, pp. 35-46.
Curran, Greg, "Security Selection for Bond Index Portfolios," Mellon Institutional Asset Management, Standish Mellon, Copyright 2005, publication date unknown.
Jaffe, Jeffrey et al., "Earnings Yields, Market Values, and Stock Returns," The Journal of Finance, vol. XLIV, No. 1, Mar. 1989.
Author Unknown, "Bond Basics: Selecting a Fixed Income Benchmark," www.pimco.com, A company of ALLIANZ, Jul. 2006, pp. 1-5.

Davis, James L., The Cross-Section of Realized Stock Returns: The Pre-COMPUSTAT Evidence, The Journal of Finance, vol. 49, No. 5 (Dec. 1994), pp. 1579-1593.

Bernard, Victor et al., "Accounting-Based Stock Price Anomalies: Separating Market Inefficiencies from Risk*," 1996 Contemporary Accounting Research Conference, Sep. 1996, pp. 1-57.

Siracusano, Luciano, "A Fundamental Challenge," The Wisdom Tree, Aug. 9, 2007.

Author Unknown, "The Role of high Yield Bonds," www.pimco.com, Publication, Feb. 2006, pp. 1-5.

Author Unknown, "Emerging Markets May Offer Opportunity to Enhance Returns," www.pimco.com, an ALLIANZ Company, Oct. 2005, pp. 1-3.

Author Unknown, "About Corporate Bonds, Overview," www.investinginbonds.com, The Securities Industry and Financial markets Association, 2005, p. 1.

Author Unknown, "Bond Basics, Fundamental Investment Strategies," www.investinginbonds.com, The Securities Industry and Financial Markets Association, 2005, p. 1.

Author Unknown, "Types of Bonds, Bond and Bond Funds; What You Should Know Before Deciding," www.investinginbonds.com, The Securities Industry and Financial Markets Association, 2005, pp. 1-2.

Lakonishok, Josef et al., NBER Working Paper Series, "Contrarian Investment, Extrapolation, and Risk," National Bureau of Economic Research, Working Paper No. 4360, May 1993.

Chan, Louis K.C., et al., "Fundamentals and Stock Returns in Japan," The Journal of Finance, vol. 46, No. 5 (Dec. 1991), pp. 1739-1764.

Chan, Louis K.C., et al., "The Risk and Return from Factors," The Journal of Financial and Quantitative Analysis, vol. 33, No. 2 (Jun. 1998), pp. 159-188.

Banz, Rolf W. et al., "Sample-Dependent Results Using Accounting and Market Data: Some Evidence," The Journal of Finance, vol. 41, No. 4 (Sep. 1986), pp. 779-793.

Bergstresser, Daniel, et al., "Investment Taxation and Portfolio Performance*," Preliminary Draft, Boston College Finance Wednesday Seminar and the 2006 UNC Tax Symposium, Apr. 12, 2006.

Robert Arnott et al., "Fundamental Indexation;" Research Affiliates Oct. 7, 2004, pp. 1-35.

Author Unknown, FRC Monitor, "Industry Trends," Nov. 2005.

Author Unknown, "Separately Managed Accounts to Become Dominant Vehicle for Individual Securities," Tower Group Research, www.advisorpage.com/modules, Advisor Page, Competitive Intelligence, Feb. 6, 2008.

Pruitt, Ron, "The Tax Advisor: All Hail the Overlay Manager," Placemark Investments, Investment Advisor, Apr. 2005.

Pruitt, Ron, "A Comprehensive View of After-tax Investing and Tax Efficiency," Placemark Investment, 2002.

Coyle, Thomas, "SunGard Hunts Trust Assets With Overlay Offering," SunGard Managed Account Solutions, www.sungard.com/Managed Accounts, Aug. 30, 2004.

Reinhart, Len, "The Bigger Picture: Will Overlay Management Become the New Business Model for Separately Managed Accounts?" Financial-Planning.com, Apr. 1, 2007.

Search Results, TowerGroup, Sep. 25, 2007.

Reinhart, Len, "The Next Big Thing: Unified Managed Accounts Must Mature Some More Before They Are Ready for Prime Time." Financial-Planning.com, Dec. 1, 2003.

Author Unknown, "Generation OPM," Wall Street Technology, www.wallstreetandtech.com, Oct. 25, 2004.

Gaffen, David A., "SMAs Take on Multiple Personalities," www.registeredrep.com, May 1, 2003.

Arnott, Robert D. et al., "The Management and Mismanagement of Taxable Assets," First Quadrant, L.P., Investment Management Reflections, 2000, No. 2.

FRC Monitor, Jan. 2001, pp. 1-12.

Waid, Robert, "Fundamentally Active," IndexUniverse.com, www.indexuniverse.com/index, Feb. 8, 2008, pp. 1-6.

Hemminki, Julius et al., "Fundamental Indexation in Europe," Journal of Asset Management, vol. 8, 6, pp. 401-405, www.palgrave-journals.com/jam, Oct. 26, 2007.

Morris, Stephen, "CARESS Working Paper #95-13 Speculative Investor Behavior and Learning," Department of Economics, University of Pennsylvania, Philadelphia, PA, May 1995.

Author Unknown, "MSCI to Adjust for Free Float and to Increase Coverage to 85%," MSCI Press Release, www.msci.com, Geneva, Dec. 10, 2000, pp. 1-3.

Brandhorst, Eric, "MSCI's Methodology Enhancements: Free-Float and Capitalization Extension," www.ssga.com, Jul. 20, 2001, pp. 1-6.

Australian Examiner's Report for AU Application 2005213293, Dated May 19, 2010.

Diversity-Weighted Indexing, Robert Fernholz, Journal of Portfolio Management, Winter 1998, pp. 74-82.

Investing at the edge (investing in non-capitalization weighted index funds), Jarrod W. Wilcox, Journal of Portfolio Management, New York, Spring 1998, vol. 24, Iss. 3; 16 pages.

Arnott, Robert D., "An Overwrought Orthodoxy", Institutional Investor Magazine, Dec. 2006.

Hsu, Jason D., "Cap-Weighted Portfolios are Sub-Optimal Portfolios", Journal of Investment Management, vol. 4, No. 3, Jul. 2006.

Arnott, Robert D., "Disentangling Size and Value", Financial Analyst Journal, Sep. 2005.

Arnott, Robert D., et al., "Does Noise Create the Size and Value Effect?", Working Paper, Jan. 2007.

Arnott, Robert D., et al., "Fundamental Indexes: Current and Future Applications", Institutional Investor Journals, Fall 2006.

Tamura, Hirmichi, et al., Global Fundamental Indices: Do they outperform market-cap weighted indices on a Global Basis?, Security Analysts Journal, Oct. 2005.

Siegel, Jeremy J., "Long-term Returns on the Original S&P 500 Components", Financial Analyst Journal, vol. 62, No. 1, Jan. 2006.

Asness, Clifford, "New and Improved Same Old Thing: The Value of Fundamental Indexing", Institutional Investor Magazine, Oct. 2006.

Arnott, Robert D., et al., "Noise CAPM and the Size and Value Effects", Journal of Investment Management, vol. 5, No. 1, Jan. 2007.

Siegel, Jeremy, "The 'Noisy Market' Hypothesis", Wall Street Journal, vol. 62, No. 1, Jun. 2006.

Research Affiliates Fundamental Index™ Fundamental Index™ Enhanced Power Point Presentations.

Retrospectives on Selected Enhanced Fundamental Index™—Strategies.

Research Affiliates, LLC Fact Sheets on RAFI™—Related—Limited Partnerships.

Unknown, "South Dakota Signs on With New Strategy", Pensions & Investments Online, Jan. 10, 2005.

Arnott, Robert D., "Whither Finance Theory", Financial Analysts Journal, Jan./Feb. 2005.

Petruno, Tom, "New Take on Index Fund Concept", Los Angeles Times, Jun. 26, 2005.

Hulbert, Mark, "A Stock Market Riddle, May Have an Answer", The New York Times, Jul. 3, 2005.

Foster, Mike, "Playing Poker With the Indices", Financial News, Jul. 11, 2005.

Jamieson, Dan, "Money Manager Challenges Cap-Weighted Market Indexes", Investment News, Jul. 18, 2005.

Coggan, Philip, "A Sound Idea With Solid Backing", Financial Times, Jul. 18, 2005.

Unknown, "FTSE and Rob Arnott Launch First Fundamental Indexes", Press Release, Jul. 19, 2005.

Unknown, "Nomura Asset Management and Research Affiliates to Launch Products Based on Fundamental Indexation", Press Release, Aug. 19, 2005.

Arvedlund, Erin E., "Wall Street Pushes Designer Index Funds", The Wall Street Journal, Aug. 25, 2005.

Unknown, "San Joaquin Ups Value-Added Real Estate Allocation", Pensions & Investments Online, Aug. 30, 2005.

Burr, Barry B., "Fundamental Index Concept Gets Institutional Investors' Attention", Pensions &Investments Online, Sep. 19, 2005.

Clements, Jonathan, "When Good Index Funds Go Bad: The Case for a 'Fundamental' Strategy", The Wall Street Journal Online, Sep. 21, 2005.

Unknown, "Canadian Fundamental 100 Income Fund Announces Initial Public Offering", Canada Newswire, Sep. 28, 2005.

Capon, Andrew, "Beta Boosting", Institutional Investor, Oct. 2005.

Burr, Barry B., "*Arnott, CFA Ethical Dance*", Pensions & Investments Online, Oct. 17, 2005.
Unknown, "*Letters to the Editor*", Pensions & Investments Online, Oct. 31, 2005.
Kinnel, Russel, "*The Five Best New Funds of 2005*", Morningstar.com, Nov. 7, 2005.
Unknown, "New Fundamental Index Series Launched by FTSE Group and Research Affiliates", PressRelease, Nov. 28, 2005.
Unknown, "PowerShares FTSE RAFI US1000 ETF Celebrates IPO On The NYSE", NYSE.com, Dec. 19, 2005.
Shazar, Jonathan, "Taking on a Heavyweight: Two Strategies—With Attendant ETFs—Take Aim At Market-Cap Weighting", Institutional Investor, Jan. 24, 2006.
Beales, Richard, "Getting Back to Fundamentals", Financial Times, Feb. 24, 2006.
Brockman, Joshua, "The New Calculus of Designer ETFs, Financial Engineers Create Enhanced Indexes" Kiplinger.com, Jun. 2006.
Goldberg, Steven, "Value Added, Don't Give Upon The S&P 500", Kiplinger.com, Mar. 21, 2006.
Luxenberg, Stan, "Fundamental Indexing", Registered Rep, Jul. 1, 2006.
Rinne, Jonas, "Translation From Swedish: The Stock Market's New Fundamentalist", Affarsvarlden, Apr. 19, 2006.
Salzinger, Mark, "An Indexing Alternative", No Load Fund Investor, Jul. 2006.
Strauss, Lawrence C., "Too Many ETFs?", Barrons, Jul. 3, 2006.
Greenberg, Gregg, "The Brains Behind Fundamental Indexing", TheStreet.com, Jul. 25, 2006.
Lauricella, Tom, et al., "Fund Track, Buyer Beware; Not All Index ETF's Are What They Appear", The Wall Street Journal Europe, Jul. 24, 2006.
Kinnel, Russ, "Fund Spy Column: Four Great Funds for 401K's and Iras Only", Morningstar, Jul. 24, 2006.
Unknown, "Asset Allocation Basics: Rebalancing", Seeking Alpha, Jul. 10, 2006.
Unknown, "CRQ, PowerShares Autonomic Allocation ETFs Cited in 'Portfolio Strategy'", Toronto Globe & Mail, Jul. 24, 2006.
Unknown, "Recap of No-Load Fund Investor Coverage of PRF, Boroson on Money", Daily Record (Morristown, NJ), Jul. 23, 2006.
Carrel, Lawrence, "Exchange-Traded Funds: ETF Focus Index Wars", SmartMoney.com, Aug. 16, 2006.
Watt, James L., CPA/PFS, "Is fundamental Indexing a Better Way to Index?", Fort Collins Coloradoan, Jul. 30, 2006.
Salisbury, Ian, "PowerShares FTSE RAFI US1000 in Article on Actively Managed ETF's", Wall Street Journal, Jul. 30, 2006.
Savage, Steve, et al., "Kiplinger's Personal Finance Investing: Fund Insights, A Better Way of Indexing?", Kiplinger, Aug. 2006.
Unknown, "Ten to Watch 2006", Registered Rep, Aug. 1, 2006.
Goldberg, Steven, "Wretched Excess Hits ETFs", Kiplinger.com, Aug. 3, 2006.
Siegel, Jeremy, "Consuelo Mack WealthTrack", PBS TV, Aug. 4, 2006.
Coggan, Philip, "Report: FT Fund Management, Fundamental Indices Are Proving Their Worth", Financial Times—UK Edition, Aug. 7, 2006.
Unknown, "Investing: Throughbred Indexes Work to Sustain Pace", International Herald Tribune, Aug. 7, 2006.
Kittsley, Dod, "Alternatively Weighted Indexes: Strategy or Benchmark?", Investment News, Op-Ed, Aug. 8, 2006.
Simon, Ellen, "New Indexes Aim to Beat Old Benchmarks", Associated Press Newswire, Aug. 8, 2006.
Simon, Ellen, "New Indexes Spiceup ETFs", Associated Press, Aug. 12, 2006.
Wherry, Rob, "Happy B-Day Vanguard 500", SmartMoney.com, Aug. 31, 2006.
Unknown, "Growth-stock Investing Has Required the Patience of Job During the Last Few Years", New York Times, Sep. 3, 2006.
Haines, Lisa et al., "AP2 Considering Expanding Use of Fundamental Indexation", Financial News (U.K.), Sep. 4, 2006.
Unknown, "XACT—First in Europe With a fundamental ET," Announcing Launch of the Exact FTSE RAFI Fundamental Euro ETF on the Stockholm Stock Exchange, and FTSE Licenses First European ETF on FTSE RAFI Index, XACT, Sep. 11, 2006.
Unknown, "Fundamental Indices Show Resilience", Financial News, Sep. 11, 2006.
Skypala, Pauline, "Stock Market Indices Prove Inefficien", Financial Times—UK Edition, Sep. 12, 2006.
Carrigan, Bill, "Being in Right Sector Proves Key With ETFs", Toronto Star, Business: Getting Technical, Sep. 15, 2006.
Unknown, "Breaking News: PowerShares Spreads the Love", IndexUniverse.com, Sep. 15, 2006.
O'Connor, Cecily, "A Fundamental Change, Research Affiliates, With 55% Gain So Far This Year, Applies Its Index Concept Beyond U.S. Stocks", Pensions & Investments Money Management, Sep. 18, 2006.
Unknown, "Merrill Lynch Claymore International Fundamental Index Accelerator Securities, Series 1", Canada NewsWire, Sep. 19, 2006.
Unknown, "ETF Versus No-Loads", No-Load Fund Investor, Sep. 19, 2006.
Conboy, Bill et al., "PowerShares Capital Management Launches Ten New ETF Portfolios on NASDAQ", M2 Presswire, Sep. 20, 2006.
Unknown, "FTSE RAFI Indexes to Be Used As Basis for World's First Fundamentally Weighted Sector ETF's", PR Newswire, Sep. 20, 2006.
Steel, Sandra, "FTSE RAFI Indexes to Be Used As Basis for the World's First Fundamentally Weighted Sector ETFs, Ten Fundamental Indexes Out-Perform Domestic Cap Weighted Equivalents", Media Information i.e. Press Release From FTSE The Index Company, Sep. 20, 2006.
Unknown, "Rob on Consuelo Mack WealthTrack", PBS Interview, Sep. 22, 2006.
Unknown, "PowerShares Pitches Alt-Weighted ETFs", Fund Action, Sep. 22, 2006.
O'Connor, Cecily, "At Research Affiliates, A Fundamental Change", Investment News. Sep. 25, 2006.
O'Donnell, Kathie, "One on One With Philip Taylor of AMVESCAP PLC, On New RAFI PowerShares", Investment News, Sep. 25, 2006.
Knight, Rebecca, "FT Wealth: Hands-On Investor, ETFs Start to Look Beyond the Index Model", Financial Times, Sep. 26, 2006.
Korn, Donald Jay, "Beyond Benchmarks, Tracking Alternative Indexes Can Add a Flavor of Active Management to the ETF Menu", Financial Planning, Oct. 1, 2006.
Saler, Tom, "Growing to the Sky", Barrons, Oct. 2, 2006.
Spence, John, "ETF Investing, For These ETFs, The Fundamental Things Apply, Firms, Experts Take Sides in Clash Over Best Investment Strategy", MarketWatch (Boston), Oct. 2, 2006.
Knight, Rebecca, "FT Report: FT Fund Management: The Big Picture", Financial Times, Oct. 2, 2006.
Ryan, Jen, "Ask The Street: So Many ETFs", TheStreet.com, Oct. 4, 2006.
Schlagheck, Jim, "Exchange Traded Funds, Getting an Edge With Fundamental Indices", TheStreet.com., Oct. 5, 2006.
Farrell, Christopher, Personal Finance, Battle for the Index Investor, Business Week, Oct. 9, 2006.
Tan Kopin, "Lipper Mutual Fund Quarterly, The Weighting Game", Barron's, Oct. 9, 2006.
Unknown, "Alternative Indices", Financial Times (U.K. Edition), Oct. 13, 2006.
Nusbaum, Roger, "Personal Finance: ETFs, A Surge of Energy ETFs", TheStreet.com, Oct. 13, 2006.
Kinnel, Russell, "Fund Spy, Great Mutual Funds Go Head to Head, It's Marsico Vs. Janus and Fidelity Vs. Vanguard", Morningstar.com, Oct. 16, 2006.
Baker, Nick, "Arnott's 'Fundamental' Stock Index Beats S&P 500, Sparks Debate", Bloomberg.com, Oct. 18, 2006.
Asness, Clifford, "The Value of Fundamental Indexing", Daily ii.com a.k.a. Institutional Investor, Oct. 19, 2006.
Baker, Nick, "Business: Marketplace by Bloomberg: Around the Markets, Rebuilding Indexes From Ground Up", International Herald Tribune, Oct. 19, 2006.
Baker, Nick, "Financial Post: FP Investing, Manager Adds Twist to Index Investing: Focus on Fundamentals", National Post (Canada), Oct. 19, 2006.

Bloomberg News, "Is Jobs' Job Safe Amid Options Scandals?, Business, Analyst Touts 'Fundamentals'", St. Paul Pioneer Press, (St. Paul, Minnesota), Oct. 22, 2006.
Sivanithy, R., "Companies: Is Fundamental Weighting Better in Nourse Indices?" The Business Times Singapore, Oct. 27, 2006.
Pender, Kathleen, "Bogle Shares His Wisdom", San Francisco Chronicle, Oct. 29, 2006.
Hajim, Corey, "Smart Strategies, A Better Way to Index?", Fortune, Oct. 30, 2006.
Editorial Staff, "Marketplace", OnWallStreet, Nov. 1, 2006.
Voyles, Bennett, "New Kid in Town: The Fundamental Index", OnWallStreet, Nov. 1, 2006.
Unknown, "Breaking News, SSgA Goes Fundamental", IndexUniverse.com, Nov. 2, 2006.
Hoffman, David, "ETF Powerhouses Leery of Fundamental Indexing", InvestmentNews.com, Nov. 6, 2006.
Dunstan, Barrie, "Supplement: Quarterly Review of Funds, Fundamental Shift Towards Value Is Best of Both Worlds", Australian Financial Review on Fundamental Indexation, Nov. 8, 2006.
Burns, Scott, "The Looming Battle: Fundamental Vs. Traditional Indexing", Scottburns.com, Nov. 11, 2006.
Burns, Scott, "As Index Funds Duke It Out, It Pays to Be Skeptical", The Boston Globe Via Boston.com, Nov. 12, 2006.
Burns, Scott, "Indexing Idea Has a Challenger", The Dallas Morning News Via DallasNews.com, Nov. 12, 2006.
Dunstan, Barrie, "News: Managed Funds—A Third Way: Fundamental Indexing (Sub-Head) There Is Fresh Life in the Debate Between Active Share Managers and Index Fund Managers", Independent Financial Review (New Zealand), Nov. 15, 2006.
Carrick, Rob, "Report on Business: Globe Investor: Portfolio Strategy, New ETFs Will Whet Your Appetite (Sub-Head) The Products May Satisfy Investors Who Like the Low Cost and Flexibility of These Funds That Trade Like a Stock", The Globe & Mail (Toronto), Nov. 18, 2006.
Plumpton, Emma (Redmayne-Bentley Stockbrokers), "Influence of Geography on the Wane", Aberdeen Press & Journal (UK), Nov. 20, 2006.
Carpenter, Margie et al., "Rethinking The World: Global Economic Changes Are Demanding a More Sophisticated Evaluation of Your Clients' Portfolio Allocations", Financial Planning Magazine, Dec. 1, 2006.
Gotlieb, Rish, "Why Portfolio Pros by ETFs, Money Managers Who Don't Have the Time to Specialize in Every Market Use the Convenience of Exchange-Traded Funds", Toronto Star, Dec. 7, 2006.
Hougan, Matthew, "Life From The Superbowl", IndexUniverse.com, Dec. 7, 2006.
Morris, Sonya, "Fund Spy—What's the Right Way to Index? (Sub-Head) Our Take on the Newest Breed of Index Funds", Morningstar.com, Dec. 12, 2006.
Unknown, "The Buttonwood Column, Weights and Measures, A Squabble Erupts Over How Best to Create a Stockmarket Index", The Economist Newspaper Limited (London), Dec. 13, 2006.
Woods, Nancy, "Financial Post: FP Weekend: Ask a Broker Column, Working Toward a Balanced Portfolio", National Post (Canada), Dec. 16, 2006.
Critchley, Barry, "Financial Post: Off the Record, Merrill (ML), Claymore (C) Steal a March," National Post (Canada), Dec. 19, 2006.
Unknown, "RA Among Enhanced-Index Managers Approved by Tacoma ERS", Pension & Investment Daily, Dec. 19, 2006.
Wherry, Rob, "Battle for Index Supremacy, and Centers of Attention: A New Generation of Indexers Want to Replace the S&P 500. Should You Follow Their Lead", SmartMoneySelect.com, Dec. 22, 2006.
Burns, Scott, "Sloth, Passivity Yield Tidy Profit, Index Funds and Broad Asset Class Diversification Keep Investing Simple", Austin-American Statesman, Statesman.com, Personal Finance, Dec. 24, 2006.
Ransom, Diana et al., "Talk the Talk: Financial Buzz Words of '07", Wall Street Journal, Dec. 26, 2006.
Time Middleton, "Mutual Funds, A Play-It-Safe Portfolio for 2007", MSN Money, Dec. 26, 2006.
Salzinger, Mark, "Feature Interview With Jason Hsu", Investor's ETF Report, Jan. 2007.
Unknown, "Bettering Fundamentals", IndexUniverse.com, Jan. 4, 2007.
Salisbury, Ian, "New ETFs to Weight Stocks by Revenue", Dow Jones, Jan. 4, 2007.
Wherry, Rob, "SmartMoney.com Picks the Best Mutual Fund of 2006", SmartMoney.com, Jan. 5, 2007.
Riley, Barry, "A Quest for Perpetual Profit Machines", Financial Times, Jan. 15, 2007.
Burton, Jonathan, "Putting ETFs in Their Place: Vanguard Indexing Guru Gus Sauter on the Best Kind of Exchanged-Traded Fund", MarketWatch.com, Jan. 9, 2007.
Fox, Justin, "Fundamentally Okay Index Funds", Time.com, Jan. 29, 2007.
Knight, Rebecca et al., "Active Solution Is Within Reach: In the Second Part in a Series, Rebecca Knight and John Authers Say the Asset Class Could Move Beyond the Passive Approach in 2007", Financial Times, Jan. 30, 2007.
Baker, Nick, et al., "Fundamental Index Sparks Debate: Arnott's FTSE RAFI US 1000 Beats The S&P 500 With a New Stock Weighting Method", Boomberg Markets Magazine, Feb. 2007.
Fazzi, Raymond, "Surprisingly Few Surprises: Value Funds, International Equities and REITS Remained Strong Last Year", Financial Advisor, Feb. 2007.
Berman, David, "Claymore Fundamental Index ETF Among 'New Breed' of ETFs", National Post (Canada), Feb. 1, 2007.
Jacobius, Arleen, "Acting on Faith: Institutional Investors Are Leaping Into Alternative Investments, But Lack Tools to Assess the Risks", Pensions & Investments, Feb. 5, 2007.
Heuer, Max, "All the Rage: Schwab Joins Fundamental Indexers", Institutional Investor Newsletter, Feb. 5, 2007.
Burke, Kevin, "The ETF Weighting Game," Registered Rep./www.registeredrep. com, Apr. 2007, pp. 79-88.
Unknown, "The most dangerous patent in finance! Is fundamental indexing patently absurd?," Research Comment, Desjardins Securities, May 7, 2007.
Salzinger, Mark, "Interview : Jason Hsu," The Investor's ETF Report, Jan. 2007.
David Hoffman, "Non-Traditional Indexes Gaining Ground in ETF World," Investment News, Feb. 12, 2007.
Rob Wherry, "Ready for an All-ETF Portfolio? Here Are Some Models," SmartMoney.com, Feb. 13, 2007.
Ray Turchansky, "Investment Vehicle Lines Get Blurry: Merits of Passive Versus Active Management Debated," Edmonton Journal, Feb. 14, 2007.
Jonathan Chevreau, "Trading Begins Today on Two New Exchange-Traded Funds From Claymore Investments," National Post (Canada), Feb. 14, 2007.
Trang Ho, "Exchange-Traded Funds: After an Excellent '06, Fast Start for Telecom," Investor's Business Daily, Feb. 16, 2007.
Matthew Richards, "Get Down to the Fundamental Factors," Financial Times, Feb. 17, 2007.
Warren Boroson, "A New Strategy for Stock Indexes," Daily Record, Feb. 18, 2007.
David Hoffman, "Weightings Ignoring Market Caps Gain in Popularity," Pensions&Investments Online, Feb. 19, 2007.
Trang Ho, "Exchange-Traded Funds: Consumer ETFs Reflect Strong Buying Trends," Investor's Business Daily, Feb. 20, 2007.
Diya Gullapalli, "On Tap: Retirement-Oriented Offerings," The Wall Street Journal, Feb. 22, 2007.
Rob Carrick, "For Your RRSP, Take a Page from the CPP," The Globe & Mail (Toronto), Feb. 24, 2007.
Rudy Luukko, "Enhanced Indexing Cuts Costs of Funds," Toronto Star, Feb. 24, 2007.
Brooke Southall, "Malkiel Defends Investing Strategy," Investment News, Feb. 26, 2007.
Susan Trammell, "Applied Science: How to Jump-Start a Quantitative Investment Process," CFA Magazine, Mar./Apr. 2007.
Eric Uhlfelder, "Challenging EAFE: Managers Who Closely Track Market-Cap-Weighted Country Indexes May Miss Opportunities," Financial Advisor Magazine, Mar. 1, 2007.
John C. Bogle, "False Promises: Index Funds That Promise to Beat the Market," Journal of Indexes, Mar./Apr. 2007.

Vincent T. Lowry, "Fundamentally Better: The Case for Revenue Weighting," Journal of Indexes, Mar./Apr. 2007.
Ron Hylton, "It's the Volatility, Stupid: The Source of Excess Returns in Alternative Index Weighting Schemes," Journal of Indexes, Mar./Apr. 2007.
Eugene F. Fama, Kenneth R. French, "Straight Talk: Nouveau Indexes, Noise and the Nonsense of Active Management," Journal of Indexes, Mar./Apr. 2007.
Sonya Morris, Editor, "Introducing Model Portfolios," Morningstar ETFInvestor, Mar. 1, 2007.
Donald Jay Korn, "ETF Mania!," Financial Planning, Mar. 1, 2007.
David Hoffman, "New ETFs Highlight Belief That Simple Is Good," Investment News, Mar. 5, 2007.
Charles Paikert, "Oyster Bar powwow no pearl for Street," Investment News, Mar. 5, 2007.
Charles Paikert, "AIM Investments® Launches AIM Independence Funds," Yahoo!Finance, Mar. 6, 2007.
Charles Leary, "The Harsh Light of Day," IndexUniverse.com, Mar. 8, 2007.
Warren Boroson, "Tough Questions for Smart Manager," Daily Record, Mar. 25, 2007.
Warren Boroson, "New Fundamental Index Fund Listed in Stockholm," XACT, Mar. 26, 2007.
Tim Middleton, "With Market Reeling, Get More Aggressive," MSN Money, Mar. 27, 2007.
Tim Middleton, "Schwab to Launch Fundamental Index Mutual Funds," Reuters, Mar. 27, 2007.
Christine Ong, "AIM Vies for Lifecycle Edge by Diversification," Ignites.com, Mar. 28, 2007.
Karen Dolan, "Morningstar's Take: PIMCO Fundamental IndexPLUS TR D PIXDX," Morningstar, Mar. 28, 2007.
Brad Zigler, "Fundamentalism and Asset Allocation," Registered Rep, Apr. 1, 2007.
Kevin Burke, "The ETF Weighting Game," Registered Rep, Apr. 1, 2007.
Kathleen M. McBride, "Catching Up With . . . Jeffrey Mortimer," Investment Advisor Magazine, Apr. 1, 2007.
Sree Vidya Bhaktavatsalam, "Schwab Offers 'Fundamental' Index Funds to Beat Market Returns," Bloomberg, Apr. 2, 2007.
Kathleen M. McBride, "A Better Mousetrap?: Schwab Launches Three Fundamental Index Funds," Investment Advisor Magazine, Apr. 2, 2007.
Jesse Emspak, "Mutual Funds & Personal Finance: Schwab Focuses on Key Fundamentals," Investor's Business Daily, Apr. 2, 2007.
Murray Coleman, "New Twist on Indexing: Mutual Funds Meet ETFs," MarketWatch, Apr. 2, 2007.
Rob Wherry, "Schwab Launches Three Funds Similar to Popular ETFs," SmartMoney.com, Apr. 2, 2007.
Rob Wherry, "Schwab Launches Fundamental Index™Mutual Funds," Yahoo!Finance, Apr. 2, 2007.
Brooke Southall, "Fundamental Differences Over Schwab Funds," Investment News, Apr. 9, 2007.
Max Heuer, "Schwab Looks Up Market," Defined Contribution & Savings Plan Alert, Apr. 9, 2007.
Katie Benner, "Trying to Build a Better Index Fund: Fortune's Guide to Exchange-Traded Funds Based on Fundamental Indexes," CNN Money, Apr. 11, 2007.
Janet Kidd Stewart, "401(k) options worth looking over: Investors should keep track as firms pitch employers more ETFs," Chicago Tribune, Apr. 15, 2007.
John Kimelman, "ETF Pro Says Stocks Aren't Worth the Risk," Barron's, Apr. 20, 2007.
Peter A. McKay, "More Professors Are Lured Out of Ivory Tower to Street: Demand for New Funds Offers a Chance to Test Theories, Make Money," The Wall Street Journal, Apr. 21, 2007.
Peter A. McKay, "North Dakota Considers Research Affiliates," Money Management Letter, Apr. 23, 2007.
Philip Coggan, "Presenting the Portfolio Rebalancing Act: Fundamental Indexation Rejects Weighting Stocks Within a Benchmark by Market Value," Investment Advisor (UK), Apr. 28, 2007.
Paul J. Lim, "The Indexing Wars," U.S. News & World Report, Apr. 29, 2007.
Douglas Appell, "Fundamental Indexing Superiority Disputed: Claim of Cap-Weighting's Drag on Return is 'False'," Pensions &Investments Online, Apr. 30, 2007.
Douglas Appell, "Fund News (excerpt)," No-Load Fund Investor, May 1, 2007.
Kathleen M. McBride, "The IA 25: Robert Arnott," Investment Advisor Magazine, May 1, 2007.
James Picerno, "The ETF revolution is looking more speculative by the day," Wealth Manager, May 1, 2007.
Jonathan Clements, "Why Aiming for Average Has Its own Genius," The Wall Street Journal, May 6, 2007.
Peter Gibson, Ed Sollbach, Jeff Evans, Elizabeth Leung, "Research Comment: Portfolio Strategy & Quantitative Research," Desjardins Securities, May 7, 2007.
Douglas Appell, "Disputing the superiority of fundamental indexing," Investment News, May 7, 2007.
Heather Bell, "Fundamental Analysis," IndexUniverse.com, May 8, 2007.
Heather Bell, "News Briefs: Analysts wary of fundamental indexes," Pensions&Investments Online, May 14, 2007.
Julian Harding, "Worth the Weight," Pensions Management, May 15, 2007.
Vernon Wessels, "Plexus Will Use Arnott's Index to Choose South African Stocks," Bloomberg, May 18, 2007.
Vernon Wessels, "Plexus scores home run with international partner," Fanews, May 18, 2007.
Jackie Cameron, "New threat for active asset managers," Moneyweb, May 18, 2007.
Kazuaki Fujita, "Eye on Fundamentals Buoying Japanese Investors (translated)," Nikkei Financial Daily, May 18, 2007.
Rob Carrick, "The case for blending passive, active indexing," The Globe & Mail (Toronto), May 19, 2007.
Warren Boroson, "Expert predicts volatile market," Daily Record, May 20, 2007.
Regis Nyamakanga, "Stock index system due to launch in SA," Business Day, May 21, 2007.
Jesse Emspak, "Exchange-Traded Funds: Fundamental Indexing Fuels PowerShares ETF," Investor's Business Daily, May 23, 2007.
Jesse Emspak, "Four New Lyxor ETFs on Fundamental Indices Launched in the XTF Segment," Deutsche Borse Group, May 24, 2007.
Rob Carrick, "Got high-dollar blues? Currency neutrality can bring peace of mind," The Globe & Mail (Toronto), May 24, 2007.
Consuelo Mack, "A message from Consuelo (an email to WealthTrack subscribers from Consuelo Mack)," PBS WealthTrack, May 24, 2007.
Kathleen Pender, "Changing indexes for funds," San Francisco Chronicle, May 24, 2007.
Kathleen Pender, "Consuelo Mack WealthTrack: An Interview with Rob Arnott (transcript)," PBS WealthTrack, May 25, 2007.
John Authers, "It's time to point the finger at the index," Financial Times, May 26, 2007.
Burton Malkiel, "Many Happy Returns," Barron's, May 28, 2007.
Don Vialoux, "More ways to access Japan: Seven exchange-traded funds now available," National Post (Canada), May 28, 2007.
Brad Zigler, "Fundamentalists at the Gates: The Trouble With Cap-Weighted Indexes," Seeking Alpha, May 31, 2007.
Rob Wherry, "Enhanced Index Funds Make a Move on Their Older Brethren," SmartMoney.com, May 31, 2007.
Marla Brill, "Indexing Debate Heats Up," Financial Advisor Magazine, Jun. 1, 2007.
Marla Brill, "The age of investment strategy indices (Roundtable Discussion)," Global Pensions, Jun. 1, 2007.
Stephen P. Brown, "Actively Managed ETFs: The Next Generation?," Registered Rep, Jun. 1, 2007.
David A. Geracioti, "From Theory to Practice," Registered Rep, Jun. 1, 2007.
Laura du Preez, "New index investment method promises more," Personal Finance, Jun. 2, 2007.
Rob Wherry, "The Index-Fund Makeover," The Wall Street Journal, Jun. 2, 2007.
Warren Boroson, "Having 'fun' in market is costly," Daily Record, Jun. 3, 2007.

Sophia Grene, "The fundamental rules apply: Rising interest in wealth weighted indices," Financial Times, Jun. 4, 2007.
Sophia Grene, "IPM launches four Fundamental Index™ Funds," Press Release, Jun. 5, 2007.
David Williams, "Want another 5% on top? (Interview with Paul Stewart)," Business Day, Jun. 7, 2007.
Sophia Grene, "Dilsaver Reveals Schwab Funds' Biggest Secret," MutualFundWire.com, Jun. 7, 2007.
Julia Taylor, "New Funds: Informed Portfolio Management," Financial Times, Jun. 11, 2007.
Pam Black, "Press Release for 'Index Smackdown' debate between Rob Arnott and Gus Sauter," Financial Planning, Jun. 12, 2007.
Lawrence Carrel, "Godfather of Fundamental Indexing Faces Challenge," TheStreet.com, Jun. 13, 2007.
Barry Critchley, "You learn something new every day: New tricks to make the market work better," National Post (Canada), Jun. 15, 2007.
Pauline Skypala, "Spa ETF's Multi-launch set to expand range of ETF trackers," Financial Times, Jun. 18, 2007.
Kathie O'Donnell, "Fundamentals-based index fund has goods, struggles for attention," Investment News, Jun. 18, 2007.
Kathie O'Donnell, "Genworth Financial's AssetMark Introduces New Fundamental Index™ Funds," Press Release, Jun. 18, 2007.
Maureen Darrigo, "Market Pulse: BNN Market Call—Som Seif," The Globe & Mail (Toronto), Jun. 19, 2007.
Maureen Darrigo, "PowerShares to Launch Four International ETFs Based on FTSE RAFI™ Indexes at the New York Stock Exchange Jun. 25, 2007," Press Release, Jun. 19, 2007.
Jesse Emspak, "Exchange-Traded Funds: PowerShares Launches Foreign Index Funds," Investor's Business Daily, Jun. 20, 2007.
Ellen Roseman, "Canadians spread cash worldwide," Toronto Star, Jun. 20, 2007.
John Kimelman, "Sampling the ETF Smorgasbord," Barron's, Jun. 22, 2007.
Kevin Bailey, "New Funds Are Old Hat," Herald Sun (Australia), Jun. 25, 2007.
Matthew Hougan, "International RAFI ETFs List on ARCA," IndexUniverse.com, Jun. 25, 2007.
Jonathan Chevreau, "One in Ten Licensed for ETF Run-Up," National Post (Canada), Jun. 25, 2007.
Jonathan Chevreau, "PowerShares Launches Four New FTSE RAFI™ International ETFs on NYSE Arca," Press Release, Jun. 25, 2007.
Jonathan Chevreau, "Hirings: AssetMark Investment Services," Pensions&Investments Online, Jun. 25, 2007.
Jonathan Chevreau, "New U.S. ETFs include Sudan-Free social ETF," Reuters, Jun. 25, 2007.
Jonathan Chevreau, "PowerShares Expands Its Global ETF Initiative Strategy at NYSE," Press Release, Jun. 25, 2007.
Tim Middleton, "Don't follow the dumb money," MSN Money, Jun. 26, 2007.
Matthew Hougan, "ETF Watch: Jun. 7-25," IndexUniverse.com, Jun. 27, 2007.
Rob Wherry, "New From Morningstar's Conference," SmartMoney.com, Jun. 28, 2007.
Mark Salzinger, "Navigating Choppier Waters With ETFs, Funds & Stocks," No-Load Fund Investor, Jul. 1, 2007.
John Spence, "Tempest in an index fund: Robert Arnott and John Bogle clash over best indexing strategy," MarketWatch, Jul. 1, 2007.
John Spence, "Research Affiliates to Sub-Advise Value- and Growth-focused Mandates Based on the Fundamental Index™ Concept for Genworth Financial's AssetMark Asset Allocation Portfolios," Press Releases, Jul. 5, 2007.
Trang Ho, "Foreign ETF Assets Up 24% So Far This Year," Investor's Business Daily, Jul. 11, 2007.
Charles Paikert, "Index battle (p. 2)," Investment News, Jul. 16, 2007.
Sonya Morris, "Measuring the Market's Value," Morningstar, Jul. 16, 2007.
Gastineau, Gary L., "The Cutting Edge," IndexUniverse.com, Jan. 2007.
Scott Burns, "Next-Generation Index Funds Coming," Dallas Morning News, Nov. 26, 2004.
Arnott, Robert, Hsu, Jason, Moore, Phil, "Redefining Indexation," Sep. 9, 2004.

Author Unknown, "Optimal Value-Weighted Portfolios," Economist's View: Value Weighted Portfolios, Jun. 14, 2006.
Author Unknown, "Stock Market Perspective: Better Ways to Index?" http://www.pankin.com/persp062.pdf.
Wooley, Scott, "The Index Insurgents," Forbes.com, Magazine article, Oct. 30, 2006.
Paul C. Wood and Richard E. Evans, "Fundamental Profit-Based Equity Indexation", Journal of Indexes, Second Quarter 2003, pp. 25-31.
Chance, Don M., "Six One Way, Half-A-Dozen the Other," www.indexuniverse.com/component/content/article/4035,Trading Places, May/Jun. 2008.
Brock, Woody, The Role of Pricing Model Uncertainty,:—Resolving Four Paradoxes in Today's Market Behavior, Strategic Economic Decisions, SED Profile May 2008.
Lydon, Tom; Wasik, John F., iMoney, "Profitable Exchange-Traded Fund Strategies for Every Investor," Chapter 2, The Art of Indexing Using the iMoney Plan, date unknown.
Author Unknown, The Role of "Pricing Model Uncertainty"—Resolving Four Paradoxes in Today's Market Behavior,—Strategic Economic Decisions, www.SEDinc.com, SED Profile, May 2008.
Office Action from related U.S. Appl. No. 10/961,404 mailed Mar. 13, 2008.
Office Action from related U.S. Appl. No. 11/196,509 mailed Mar. 19, 2008.
Bazley, John D., Financial Accounting Concepts and Uses, PWS-Kent Publishing Company, 1988, p. 4.
Fernholz, Robert, Diversity-Weighted Indexing, Journal of Portfolio Management, Winter 1998, pp. 74-82.
International Search Report and Written Opinion from PCT/US2008/003762 mailed Sep. 10, 2008.
International Search Report and Written Opinion issued in PCT/US2007/018534 mailed Sep. 17, 2008.
Office Action issued Oct. 3, 2008 in related U.S. Appl. No. 10/159,610.
DRM Portion of CalPERS' Presentation Given on Jan. 12, 2001, 4 pages.
D. Morris, AIMIC Press Conference Presentation—Tokyo, May 29, 1998 (10 pages).
J. Chernoff, "A New Look in Benchmarks: Consultant Devises Alternative Based on Country Wealth." Pensions & Investments Onling (plonline.com), Apr. 14, 1997 (4 pages).
"Index Industry Leaders . . . In Their Own Words," Journal of Indexes, Sep./Oct. 2006, pp. 10-21.
Chernoff, Joel, "A New Look in Benchmarks: Consultant Devises Alternative Based on Country Wealth," Pensions & Investments Online, Issue Date: Apr. 14, 1997.
Raub, David, "Rethinking Indexing," www.NorthBaybiz.com, Issue: Apr. 2006.
Author Unknown, "Methodology for the Management of the FTSE RAFI (Research Affiliates Fundamental Index) Index Series," The FTSE RAFI Index Series Ground Rules, Version 1.1, Dec. 2005.
Serwer, Andy, "Brains, Pluck, and Bucks," CNNMoney.com/magazines/fortune/ fortune_archives, Jul. 3, 2006.
Arnott, Robert, "Retrospectives on Selected Fundamental Index Strategies," Research Affiliates, Dec. 2005.
Treynor, Jack, "Perspectives; Why Market-Valuation-Indifferent Indexing Works," Financial Analysts Journal, vol. 61, No. 5, CFA Institute, Sep./Oct. 2005.
Arnott, Rob and Hennessy, David, "Research Affiliates Fundamental Index," Feb. 2006.
Author Unknown, "PowerShares FTSE RAFI US 1000 Portfolio," www.powershares.com, PRF Facts, Sep. 30, 2005.
Markowitz, Harry M., "Market Efficiency: A Theoretical Distinction and So What?" www.cfapubs.org, Financial Analysts Journal, Reflections, CFA Institute, Sep./Oct. 2005, pp. 17-30.
Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005.
Hsu, Jason C. and Campollo, Carmen, "New Frontiers in Index Investing," Journal of Indexes, Jan./Feb. 2006, pp. 32-34, 36, 37, 58.

Makepeace, Mark, "FTSE: Coming to America," Journal of Indexes, Jan./Feb. 2006, pp. 38-39.

Blanchett, David, "Building the Best Index; Equal-Weighting vs. Market Capitalization," Journal of Indexes, Jan./Feb. 2006, pp. 40-42.

Gastineau, Gary, "Is Indexing Ready for the Challenges of the 21st Century?", Journal of Indexes, The Cutting Edge, Mar./Apr. 2006, pp. 32-35.

Author Unknown, "William F. Sharpe Awards—Plus Editorial Board Meeting Excerpts," Journal of Indexes, Mar./Apr. 2006, pp. 36-41.

Author Unknown, "FTSE/RAFI PowerShares ETF Launches on Big Board," Journal of Indexes, Mar./Apr. 2006, pp. 51-52.

Leake, Thomas and Morris, David, "Where Next for the Index Business Model? Bringing Low Cost to the World of Active Management," Journal of Indexes, May/Jun. 2006, pp. 22-26.

Schoenfeld, Steven A. and Ginis, Robert E., "Worth Weighting For? A Survey and Critique of Alternatively Weighted Indexes," Journal of Indexes, May/Jun. 2006, pp. 10-21.

Author Unknown, "CalPERS Goes Fundamental," News, Indexing Developments, Journal of Indexes, May/Jun. 2006, p. 52.

Arnott, Robert D., "What Cost "Noise"?" Financial Analysts Journal, Editor's Corner, CFA Institute, Mar./Apr. 2005, pp. 10-14.

Arnott et al., "Redefining Indexation," Research Affiliates, LLC, pp. 1-24, 2004.

Author Unknown, "Dividend Party Goes Global," Journal of Indexes, Mar./Apr. 2006, p. 52.

Office Action issued Jul. 8, 2009 in related U.S. Appl. No. 11/509,002.

Office Action issued Aug. 6, 2009 in related U.S. Appl. No. 10/159,610.

Office Action in JP Counterpart Application No. 2006-552146, May 25, 2010.

Advisory Action dated Feb. 25, 2009 issued in related U.S. Appl. No. 11/196,509.

Office Action dated Nov. 25, 2008 issued in related U.S. Appl. No. 10/961,404.

Office Action issued Dec. 5, 2008 in related CN application No. 200580000459.0.

Decision issued Feb. 2, 2009 in related GB application No. 0616163.2.

Decision issued Feb. 19, 2009 in related GB application No. 0222239.6.

International Search Report and Written Opinion issued Dec. 21, 2007 in related Appl. PCT/US2006/042430.

Kaplan, Paul, "Let's Not All Become Fundamental Indexers Just Yet," Journal of Indexes, Jan./Feb. 2009, pp. 34-37.

Point/Counterpoint, "The Fundamental Debate," Journal of Indexes, Jan./Feb. 2009, pp. 30-33, continued on p. 51.

Prestbo, John, In Perspective; "Weighting It Out," Journal of Indexes, Jan./Feb. 2009, pp. 38-40.

Communication from the European Patent Office dated Dec. 3, 2009, issued in related European Patent Application No. 03726210.2.

* cited by examiner

VALUATION INDIFFERENT NON-CAPITALIZATION WEIGHTED INDEX AND PORTFOLIO

CROSS-REFERENCE TO RELATED APPLICATIONS

The present application is a non-provisional application claiming priority to U.S. Provisional Patent Application No. 60/541,733 entitled, "Securities Indexing," to Arnott, filed Feb. 4, 2004, the contents of which is incorporated herein by reference in its entirety.

BACKGROUND OF THE INVENTION

1. Field of the Invention

This invention pertains generally to securities investing and more specifically to construction and use of passive portfolios and indexes.

2. Related Art

Conventionally, there are various broad categories of securities portfolio management. One conventional securities portfolio management category is active management wherein the securities are selected for a portfolio individually based on economic, financial, credit, and/or business analysis; on technical trends; on cyclical patterns; etc. Another conventional category is passive management, also called indexing, wherein the securities in a portfolio duplicate those that make up an index. The securities in a passively managed portfolio are conventionally weighted by relative market capitalization weighting or equal weighting. Another middle ground conventional category of securities portfolio management is called enhanced indexing, in which a portfolio's characteristics, performance and holdings are substantially dominated by the characteristics, performance and holdings of the index, albeit with modest active management departures from the index.

The present invention relates generally to the passive and enhanced indexing categories of portfolio management. A securities market index, by intent, reflects an entire market or a segment of a market. A passive portfolio based on an index may also reflect the entire market or segment. Often every security in an index is held in the passive portfolio. Sometimes statistical modeling is used to create a portfolio that duplicates the profile, risk characteristics, performance characteristics, and securities weightings of an index, without actually owning every security included in the index. (Examples could be portfolios based on the Wilshire 5000 Equity Index or on the Lehman Aggregate Bond Index.) Sometimes statistical modeling is used to create the index itself such that it duplicates the profile, risk characteristics, performance characteristics, and securities weightings of an entire class of securities. (The Lehman Aggregate Bond Index is an example of this practice.)

Indexes are generally all-inclusive of the securities within their defined markets or market segments. In most cases indexes may include each security in the proportion that its market capitalization bears to the total market capitalization of all of the included securities. The only common exceptions to market capitalization weighting are equal weighting of the included securities (for example the Value Line index or the Standard & Poors 500 Equal Weighted Stock Index, which includes all of the stocks in the S&P 500 on a list basis; each stock given equal weighting as of a designated day each year) and share price weighting, in which share prices are simply added together and divided by some simple divisor (for example, the Dow Jones Industrial Average). Conventionally, passive portfolios are built based on an index weighted using one of market capitalization weighting, equal weighting, and share price weighting.

Advantages of passive investing include: a low trading cost of maintaining a portfolio that has turnover only when an index is reconstituted, typically once a year; a low management cost of a portfolio that requires no analysis of individual securities; and no chance of the portfolio suffering a loss—relative to the market or market segment the index reflects—because of misjudgments in individual securities selection.

Advantages of using market capitalization weighting as the basis for a passive portfolio include that the index (and therefore a portfolio built on it) remains continually 'in balance' as market prices for the included securities change, and that the portfolio performance participates in (i.e., reflects) that of the securities market or market segment included in the index.

The disadvantages of market capitalization weighting passive indexes, which can be substantial, center on the fact that any under-valued securities are underweighted in the index and related portfolios, while any over-valued securities are over weighted. Also, the portfolio based on market capitalization weighting follows every market (or segment) bubble up and every market crash down. Finally, in general, portfolio securities selection is not based on a criteria that reflects a better opportunity for appreciation than that of the market or market segment overall.

SUMMARY OF THE INVENTION

An exemplary embodiment of the present invention is directed to a new method, system and computer program product for passive investing that is based on indexes which are built with metrics other than market capitalization weighting, share price weighting or equal weighting. Among these metrics are various financial data of the company issuing securities, including but not limited to book value, sales, revenue, earnings, earnings per share, income, income growth rate, dividends, dividends per share, earnings before interest, tax, depreciation and amortization, etc. In another exemplary embodiment, other nonfinancial and non-market capitalization metrics can be used as the basis for compiling an index, such as, e.g., but not limited to, an index of companies with chief executive officers (CEOs) having graduated from a particular university.

A common element included in an exemplary embodiment of the present invention, which is entirely missing from conventionally available forms of index construction, is that the indexes of the present invention are "valuation-indifferent." That is, conventional indexes do not take account of classical valuation ratios, which causes the conventional indexes to create a natural tendency to over-weight the over-valued and under-weight the under-valued securities in the conventional indexes and portfolios based on them. While this cause also holds true for equal weighting, we exclude that as an already-extant (and trivial) exception.

The use of these non-market capitalization metrics according to the exemplary embodiment of the present invention, allows the construction of indexes and resulting passive portfolios that better reflect the economic scale and/or long-term growth potential of the individual securities within a market or market segment than do conventional capitalization weighting, share price weighting, or equal weighting. The non-market capitalization metrics according to an exemplary embodiment of the present invention, allow construction of indexes and resulting passive portfolios that offer to an investor who wishes to participate in a market or market segment a choice of passive portfolio alternatives with different risk characteristics. The indexes and portfolios based on them according to the exemplary embodiment of the present invention, also provide these additional advantages while maintaining the conventional benefits of passive investing. In historical testing, these non-market capitalization metrics are found to outperform the conventional capitalization-weighted indexes over extended periods of time, with similar or lower portfolio risk.

Overall, the availability of non-market capitalization indexes, and the passive and enhanced index portfolios based on them, have the potential to reduce investment costs through more widespread use of low-cost passive and enhanced-index investing. The present invention has the potential to improve investment returns versus the securities markets through the use of a securities weighting framework which is not subject to a natural tendency to overemphasize over-valued securities and underemphasize under-valued securities. The present invention also has the potential to reduce portfolio volatility through the use of securities weighting criteria that are less reflective of 'irrational exuberance.' An exemplary embodiment of the present invention also has the potential to offer 'customized' passive portfolios as each metric may have its own specific performance and risk characteristics.

An exemplary embodiment of the present invention sets forth a system, method, and computer program product for constructing a non-capitalization weighted portfolio of assets. In an exemplary embodiment, the method may include: (a) gathering data about a plurality of assets; (b) selecting a plurality of assets to create the index of assets; and (c) weighting each of the plurality of assets selected in the index based on an objective measure of scale of each of the plurality of assets, wherein the weighting may include: (i) weighting at least one of the plurality of assets; and (ii) weighting other than weighting based on market capitalization, equal weighting, and/or share price weighting.

In one exemplary embodiment, (c) may include weighting each of the plurality of assets, where each of the assets may include a stock; a commodity; a futures contract; a bond; a mutual fund; a hedge fund; a fund of funds; an exchange traded fund (ETF); a derivative; or a negative weighting on any asset.

In one exemplary embodiment, (c) may include weighting each of the plurality of assets, where each of the assets may include a stock.

In one exemplary embodiment, (c) may include weighting each of the plurality of assets, where each of the assets may include a commodity.

In one exemplary embodiment, (c) may include weighting each of the plurality of assets, where each of the assets may include a futures contract.

In one exemplary embodiment, (c) may include weighting each of the plurality of assets, wherein each of the assets may include a bond.

In one exemplary embodiment, (c) may include weighting each of the plurality of assets, where each of the assets may include a mutual fund.

In one exemplary embodiment, (c) may include weighting each of the plurality of assets, where each of the assets may include a hedge fund.

In one exemplary embodiment, (c) may include weighting each of the plurality of assets, where each of the assets may include a fund of flunds.

In one exemplary embodiment, (c) may include weighting each of the plurality of assets, where each of the assets may include an exchange traded fund (ETF).

In one exemplary embodiment, (c) may include weighting each of the plurality of assets, where each of the assets may include a derivative.

In one exemplary embodiment, (c) may include a negative weighting on any asset.

In one exemplary embodiment, the negative weighting may be performed for purposes of establishing, or measuring, performance for any security, a portfolio of assets, a hedge fund, and/or a long/short position.

In one exemplary embodiment, (c) may include weighting based on the objective measure of scale, where the objective measure of scale may include a measure of company size associated with each of the plurality of assets.

In one exemplary embodiment, the measure of company size may include one or more of: gross revenue, sales, income, earnings before interest and tax (EBIT), earnings before interest, taxes, depreciation and amortization (EBITDA), number of employees, book value, assets, liabilities, and/or net worth.

In one exemplary embodiment, (c) may include weighting based on the objective measure of scale, where the objective measure of scale includes a measure relating to an underlying asset itself.

In one exemplary embodiment, the asset may include a municipality, a municipality issuing bonds, or a commodity.

In one exemplary embodiment, the objective measure of scale associated with the asset may include one or more of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

In one exemplary embodiment, (c) may include weighting each of the assets in the index based on the objective measure of scale, where the objective measure may include a ratio of any combination of the objective measures of scale of the asset other than ratios based on weighting the assets based on market capitalization, equal weighting, or share-price weighting.

In one exemplary embodiment, the ratio of any combination of the objective measures of scale may include one or more of: current ratio, debt ratio, overhead expense as a percent of sales, and/or debt service burden ratio.

In one exemplary embodiment, the objective measure of scale may include a demographic measure of the asset.

In one exemplary embodiment, the demographic measure of scale may include one or more of: employees, floor space, office space, location, and/or other demographics of an asset.

In one exemplary embodiment, the measure of company size may include one or more demographic measure of the asset.

In one exemplary embodiment, the demographic measure of the asset may include one or more of a non-financial metric, a non-market related metric, a number of employees, floor space, office space, and/or other demographics of the asset.

In one exemplary embodiment, (c) may include weighting based on the objective measure of scale, where the objective measure of scale may include a geographic metric.

In one exemplary embodiment, the geographic metric may include a geographic metric other than gross domestic product (GDP) weighting.

In one exemplary embodiment, the method may include a passive investing method that may include: constructing the portfolio of assets according to the index.

In one exemplary embodiment, the portfolio of assets may include one or more of: a fund; a mutual fund; a fund of funds; an asset account; an exchange traded fund (ETF); a separate account, a pooled trust; and/or a limited partnership.

In one exemplary embodiment, the method may further include: selecting a plurality of assets for trading according to the index; and trading one or more of said plurality of assets based on said weighting of the index.

In one exemplary embodiment, the trading may include: rebalancing the portfolio based on the index.

In one exemplary embodiment, rebalancing may include: rebalancing on a periodic basis.

In one exemplary embodiment, rebalancing may include: rebalancing based on the assets reaching a threshold.

In one exemplary embodiment, the method may further include applying rules associated with the index.

In one exemplary embodiment, the method of constructing the non-market capitalization weighted portfolio may be used for one or more of: investment management, and/or investment portfolio benchmarking.

In one exemplary embodiment, the method may include an enhanced index investing method. The method may include constructing the portfolio of assets in a fashion in which at least one of holdings, performance, or characteristics, are substantially similar to the index.

In one exemplary embodiment, the method may be a computer-implemented method and (a) may include: gathering data using computerized databases.

In one exemplary embodiment, (c) may include weighting based on a non-market capitalization financial metric associated with each of the plurality of assets, and a non-financial metric associated with each of said plurality of assets.

In another exemplary embodiment, a system for constructing a non-capitalization weighted portfolio of assets may include: means for gathering data about a plurality of assets; means for selecting a plurality of assets to create the index of assets; and weighting means for weighting each of said plurality of assets selected in the index based on an objective measure of scale of said each of said plurality of assets, wherein said weighting means may include: means for weighting at least one of said plurality of assets; and means for weighting other than weighting based on at least one of market capitalization, equal weighting, or share price weighting.

In yet another exemplary embodiment, a non-capitalization weighted portfolio of assets construction system, may include: a processor adapted to gather data about a plurality of assets; adapted to select a plurality of assets to create the index of assets; adapted to weight each of the plurality of assets selected in the index based on an objective measure of scale of the each of said plurality of assets; adapted to weight at least one of the plurality of assets; and adapted to weight other than based on at least one of market capitalization, equal weighting, or share price weighting.

In another exemplary embodiment, a machine readable medium that provides instructions which when executed by a computing platform, cause the computing platform to perform operations may include a method of constructing a non-capitalization weighted portfolio of assets, the method may include: (a) gathering data about a plurality of assets; (b) selecting a plurality of assets to create the index of assets; and (c) weighting each of said plurality of assets selected in the index based on an objective measure of scale of said each of said plurality of assets, wherein said weighting comprises: (i) weighting at least one of said plurality of assets; and (ii) weighting other than weighting based on at least one of market capitalization, equal weighting, or share price weighting.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings. In the drawings, like reference numbers generally indicate identical, functionally similar, and/or structurally similar elements. The drawing in which an element first appears is indicated by the leftmost digits in the corresponding reference number. A preferred exemplary embodiment is discussed below in the detailed description of the following drawings.

DETAILED DESCRIPTION OF EXEMPLARY EMBODIMENTS OF THE PRESENT INVENTION

Various exemplary embodiments of the invention are discussed in detail below including a preferred embodiment. While specific implementations are discussed, it should be understood that this is done for illustration purposes only. A person skilled in the relevant art can recognize that other components and configurations may be used without parting from the spirit and scope of the invention.

Figure 1:
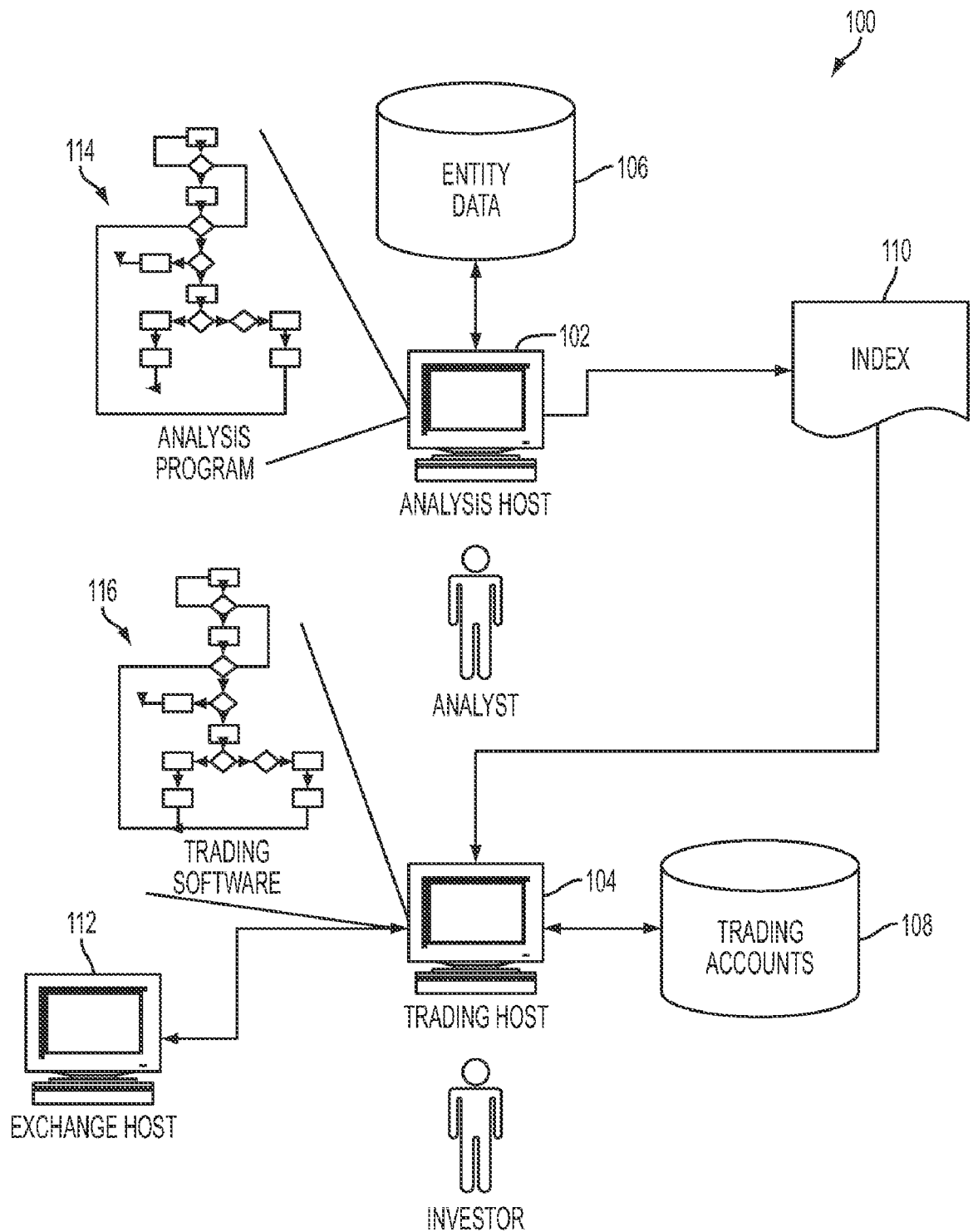
FIG. 1 is a deployment diagram of an index generation and use process in accordance with an exemplary embodiment of the present invention.

FIG. 1 depicts an exemplary deployment diagram of an index generation and use process in accordance with an exemplary embodiment of the present invention. According to the exemplary embodiment, an analyst may use a computer system to generate an index. The analyst may do so by using analysis software to examine data about entities offering different kinds of securities that may be traded by investors. An example of an entity that may be offering securities may be a publicly held company whose shares trade on an exchange. However, the present invention also applies to any entity that may have any type of security that may be traded where information about the entity and/or its security is available (or capable of being made available) for analysis.

In an exemplary embodiment, once an index has been generated by an analyst using the entity date, the index may be used to build investment portfolios. An investor, advisor, manager or broker may then manage the purchased securities as a mutual fund for a plurality of individual and institutional investors. Alternatively, the purchased securities may be managed for one or more investors. In the latter case, securities may be purchased based on the index for inclusion in an individual or an institutional investor's portfolio.

Figure 2:
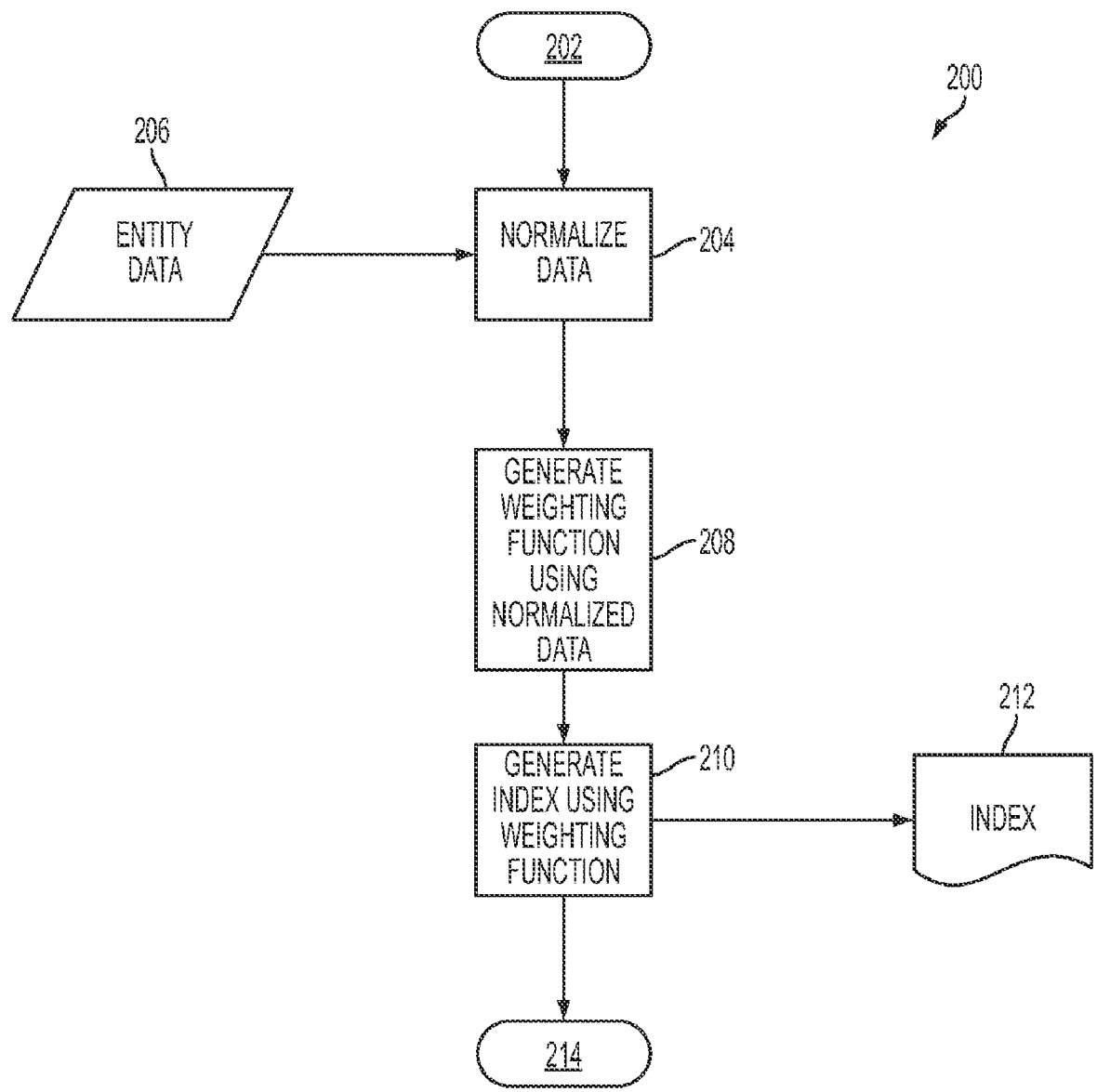
FIG. 2 is a process flow diagram of an index generation process in accordance with an exemplary embodiment of the present invention.

FIG. 2 depicts an exemplary process flow diagram of an index generation process in accordance with an exemplary embodiment of the present invention. In an exemplary embodiment, to generate an index, an analyst using analysis software may access entity data about various entities that have securities that are traded. For example, publicly traded companies must disclose information about certain financial aspects of their operations. This information may be aggregated for a plurality of entities. Market sectors and corresponding indices may then be identified and generated using the aggregate data.

In slightly more detail, an index may be generated by normalizing entity data for a particular non-market capitalization metric. The normalized entity data may be used to generate a weighting function describing the contribution of each entity to a business sector as defined by the metric, in an exemplary embodiment. An index may be generated using the weighting function. Once an index is generated, according to an exemplary embodiment, the index may be used to track the business sector defined by the metric or to create a portfolio of securities offered by the entities whose information was used to generate the index.

For example, in an exemplary embodiment of the invention a method of constructing a non-capitalization weighted portfolio of assets may include, e.g., gathering data about various assets; selecting a group of assets to create the index of assets; and weighting each of the group of assets selected in the index based on an objective measure of scale of each member of the group of assets, where the weighting may include weighting all or a subset of the group of assets, and weighting based on other than market capitalization, equal weighting, or share price weighting.

In one exemplary embodiment, the weighting of each member of the group of assets, may include weighting assets of any of various types. Examples of various types of assets may include, e.g., but not limited to, a stock type; a commodity type; a futures contract type; a bond type; a mutual find type; a hedge fund type; a fund of funds type; an exchange traded fund (ETF) type; and a derivative type assets. The weighting may also include, e.g., but not limited to, a negative weighting on any of the various types of assets.

According to exemplary embodiments of the present invention, the index may be weighted based on an objective measure of scale, where the objective measure of scale may include a measure relating to an underlying asset itself. The asset may include a municipality, a municipality issuing bonds, or a commodity. An objective measure of scale associated with the asset may include any combination of: revenue, profitability, sales, total sales, foreign sales, domestic sales, net sales, gross sales, profit margin, operating margin, retained earnings, earnings per share, book value, book value adjusted for inflation, book value adjusted for replacement cost, book value adjusted for liquidation value, dividends, assets, tangible assets, intangible assets, fixed assets, property, plant, equipment, goodwill, replacement value of assets, liquidation value of assets, liabilities, long term liabilities, short term liabilities, net worth, research and development expense, accounts receivable, earnings before interest, taxes, dividends, and amortization (EBITDA), accounts payable, cost of goods sold (CGS), debt ratio, budget, capital budget, cash budget, direct labor budget, factory overhead budget, operating budget, sales budget, inventory method, type of stock offered, liquidity, book income, tax income, capitalization of earnings, capitalization of goodwill, capitalization of interest, capitalization of revenue, capital spending, cash, compensation, employee turnover, overhead costs, credit rating, growth rate, tax rate, liquidation value of company, capitalization of cash, capitalization of earnings, capitalization of revenue, cash flow, and/or future value of expected cash flow.

Ratios too may be used. In an exemplary embodiment, the weighting of assets in the index based on objective measures of scale, may include a ratio of any combination of the objective measures of scale of the asset other than ratios based on weighting the assets based on market capitalization, equal weighting, or share-price weighting. For example, the ratio of any combination of the objective measures of scale may include, e.g., but not limited to, current ratio, debt ratio, overhead expense as a percent of sales, or debt service burden ratio.

In an exemplary embodiment, the portfolio of assets may include, e.g., but not limited to, one or more of, a fund; a mutual fund; a fund of funds; an asset account; an exchange traded fund (ETF); a separate account, a pooled trust; or a limited partnership.

In an exemplary embodiment, a measure of company size may include one of, or a combination of one or more of gross revenue, sales, income, earnings before interest and tax (EBIT), earnings before interest, taxes, depreciation and amortization (EBITDA), number of employees, book value, assets, liabilities, or net worth.

In one exemplary embodiment, the measure of company size may include a demographic measure of the asset. The demographic measure of the asset may include, e.g., one of, or any combination of one or more of a non-financial metric, a non-market related metric, a number of employees, floor space, office space, or other demographics of the asset.

In an exemplary embodiment, weighting may be based on the objective measure of scale, where the measure may include a geographic metric. The geographic metric in an exemplary embodiment may include a geographic metric other than gross domestic product (GDP) weighting.

Figure 3:
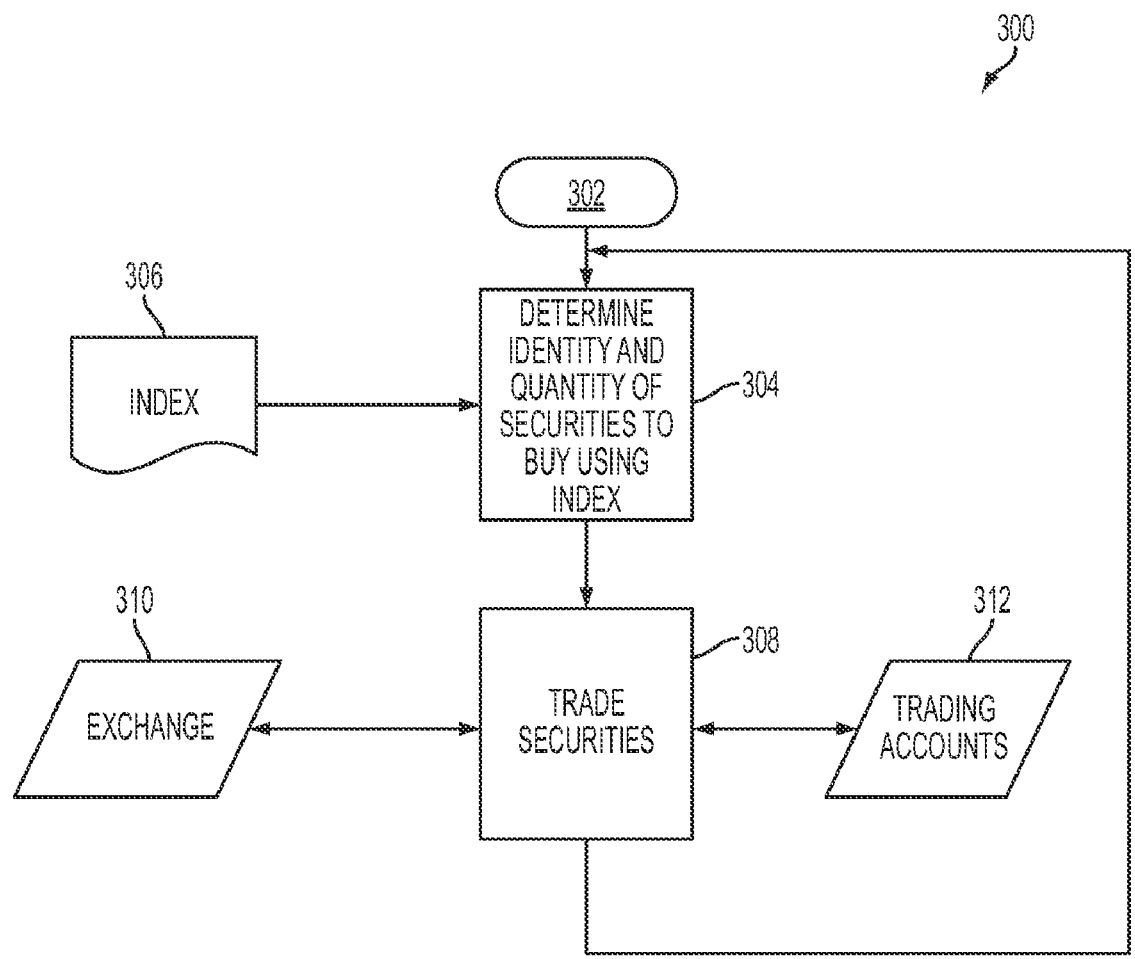
FIG. 3 is a process flow diagram of an index use process in accordance with an exemplary embodiment of the present invention.

FIG. 3 depicts an exemplary process flow diagram of an index use process in accordance with an exemplary embodiment of the present invention. An index may be received from an index generation process and may be used to determine the identity and quantity of securities to purchase for a portfolio, according to an exemplary embodiment. The securities may be purchased from an exchange or other market and may be held on account for an investor or group of investors. The index may be updated on, e.g., but not limited to, a periodic basis and may be used as a basis to rebalance the portfolio, according to an exemplary embodiment. According to another exemplary embodiment, the portfolio can be rebalanced when, e.g., a pre-determined threshold is reached. In this way, a portfolio may be created and maintained based on a non-market capitalization index.

Rebalancing can be based on assets reaching a threshold condition or value. For example, but not limited to, rebalancing may occur upon reaching a threshold such as, e.g., 'when the portfolio of assets increases in market value by 20%,' or 'when the assets on a sub-category within the portfolio exceed 32% of the size of the portfolio,' or 'when a U.S. President is elected from a different party than the incumbent,' etc.

The present invention, in an exemplary embodiment may be used the non-market capitalization weighted portfolio may be used for investment management, or investment portfolio benchmarking.

An exemplary embodiment of the invention may be implemented on a computing device(s), processor(s), computer(s) and/or communications device(s).

The computer, in an exemplary embodiment, may comprise one or more central processing units (CPUs) or processors, which may be coupled to a bus. The processor may, e.g., access main memory via the bus. The computer may be coupled to an input/output (I/O) subsystem such as, e.g., but not limited to, a network interface card (NIC), or a modem for access to a network. The computer may also be coupled to a secondary memory directly via bus, or via a main memory, for example. Secondary memory may include, e.g., but not limited to, a disk storage unit or other storage medium. Exemplary disk storage units may include, but are not limited to, a magnetic storage device such as, e.g., a hard disk, an optical storage device such as, e.g., a write once read many (WORM) drive, or a compact disc (CD), or a magneto optical device. Another type of secondary memory may include a removable disk storage device, which may be used in conjunction with a removable storage medium, such as, e.g. a CD-ROM, or a floppy diskette. In general, the disk storage unit may store an application program for operating the computer system referred to commonly as an operating system. The disk storage unit may also store documents of a database (not shown). The computer may interact with the I/O subsystems and disk storage unit via bus. The bus may also be coupled to a display for output, and input devices such as, but not limited to, a keyboard and a mouse or other pointing/selection device.

In this document, the terms "computer program medium" and "computer readable medium" may be used to generally refer to media such as, e.g., but not limited to removable storage drive, a hard disk installed in hard disk drive, and signals, etc. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. While this invention has been particularly described and illustrated with reference to a preferred embodiment, it will be understood to those having ordinary skill in the art that changes in the above description or illustrations may be made with respect to formal detail without departing from the spirit and scope of the invention.

What is claimed is:

1. A method of constructing an index of assets (I), the method implemented by at least one analysis host processor, the at least one analysis host processor comprising at least one computer processor, the method comprising:
  (a) accessing by the at least one analysis host processor of one or more databases storing and permitting retrieval of data (D) about a plurality of entities (E) and a plurality of corresponding assets (A) each issued by or having been issued by at least one of the plurality of entities (E);
  (b) receiving by the at least one analysis host processor at least one objective measure of scale (O) regarding one or more of the plurality of said assets, or one or more of the plurality of said entities (E) associated with said corresponding assets (A);
  (c) retrieving by the at least one analysis host processor one or more of said data (D) about said plurality of said entities (E) and said corresponding assets (A);
  (d) selecting by the at least one analysis host processor a selection from said plurality of said assets (A) and said entities (E) to comprise a plurality of constituent index assets (IA) comprising the index of assets (I), wherein said selecting comprises:
    (i) selecting by the at least one analysis host processor said one or more data (D) to be a quantitative data (Q) reflecting the amount of said at least one objective measure of scale (O) associated with each of said entities, wherein said at least one objective measure of scale (O) is substantially independent of the market prices (P) of any of said assets (A) and is substantially independent of a market capitalization (MC) of any of said entities (E), wherein said at least one objective measure of scale (O) comprises a measure of size (SZ) of each said entity (E) associated with each said given asset (A), and wherein said measure of the size (SZ) of each said entity (E) corresponding to each said asset (A) comprises at least one of:

a demographic measure of a said entity (E) associated with said asset (A);

a financial metric of a said entity (E) associated with said asset (A);

a metric from information disclosures of a publicly traded entity; or a metric from information about a said entity (E) associated with said asset (A);

(ii) ranking by the at least one analysis host processor said entities (E) based upon at least one of a said quantitative data (Q) associated with the at least one objective measure of scale (O) of each of said entities (E); and (iii) selecting by the at least one analysis host processor said selection from said plurality of said assets (A) or said entities (E) to comprise said plurality of constituent index assets (IA) based on said ranking; and (e) calculating by the at least one analysis host processor proportional weights for the index of assets to be objective measure of scale weights (OW) substantially independent of the market prices (P) of any of said assets (A) and substantially independent of a market capitalization (MC) of any of said entities (E), wherein said calculating comprises:

(i) adding by the at least one analysis host processor the quantitative data (Q) of each of said at least one objective measure of scale (O) for all of said constituent index assets (IA) to yield a sum total quantitative data (SUMQ) for said at least one objective measure of scale (O); and (ii) determining by the at least one analysis host processor a relative size of the quantitative data (Q) of a said at least one objective measure of scale (O) for each said constituent index asset (IA) as a proportion of said sum total quantitative data (SUMQ) for said at least one objective measure of scale (O) to yield the objective measure of scale weight (OW) of each of the constituent index assets (IA) comprising the index of assets (I), wherein said at least one objective measure of scale (O) comprises a measure of size (SZ) of each said entity (E) associated with each said given constituent index asset (IA), and wherein said measure of the size (SZ) of each said entity (E) corresponding to each said constituent index asset (IA) comprises at least one of:

a demographic measure of a said entity (E) associated with said constituent index asset (IA);

a financial metric of a said entity (E) associated with said constituent index asset (IA);

a metric from information disclosures of a publicly traded entity; or a metric from information about a said entity (E) associated with said constituent index asset (IA).

2. The analysis host implemented method according to claim 1, wherein each of said assets comprises at least one of: a stock; a commodity; a futures contract; a bond; a municipal bond; a corporate bond; a mutual fund; a hedge fund; a fund of funds; an exchange traded fund (ETF); or a derivative.

3. The analysis host implemented method according to claim 1, wherein each of said assets comprises a stock.

4. The analysis host implemented method according to claim 1, wherein each of said assets comprises a commodity.

5. The analysis host implemented method according to claim 1, wherein each of said assets comprises a futures contract.

6. The analysis host implemented method according to claim 1, wherein each of said assets comprises a bond.

7. The analysis host implemented method according to claim 1, wherein each of said assets comprises a mutual fund.

8. The analysis host implemented method according to claim 1, wherein each of said assets comprises a hedge fund.

9. The analysis host implemented method according to claim 1, wherein each of said assets comprises a fund of funds.

10. The analysis host implemented method according to claim 1, wherein each of said assets comprises an exchange traded fund (ETF).

11. The analysis host implemented method according to claim 1, wherein each of said assets comprises a derivative.

12. The analysis host implemented method according to claim 1, wherein said (e) comprises performing a negative weighting on any of said assets.

13. The analysis host implemented method according to claim 12, wherein said performing said negative weighting comprises at least one of: establishing or measuring performance, for at least one of: any security; a portfolio; a hedge fund; or at least one of: a long or a short position.

14. The analysis host implemented method according to claim 1, wherein said objective measure of scale comprises a measure relating to at least one of an underlying attribute of one of the assets, or the entity associated with the asset.

15. The analysis host implemented method according to claim 1, wherein said entity comprises at least one of: a company; a municipality; a municipality issuing bonds; a country; or an issuer of the asset.

16. The analysis host implemented method according to claim 1, wherein said objective measure of scale comprises at least one of a mathematical transformation of at least one objective measure of scale, or a ratio of any combination of objective measures of scale relating to one or more of said assets and the ratio is not based on any one of: weighting said one or more assets based on market capitalization; equal weighting; or weighting in proportion to the price of said one or more assets.

17. The analysis host implemented method according to claim 16, wherein said ratio of any combination of said objective measures of scale comprises at least one of:

a current ratio, a debt ratio, an overhead expense as a percent of sales, or a debt service burden ratio.

18. The analysis host implemented method according to claim 1, wherein said (e) comprises weighting based on said objective measure of scale, wherein said objective measure of scale comprises an economic indicator.

19. The analysis host implemented method according to claim 1, wherein said objective measure of scale comprises a measure tied to a particular geography associated with the assets.

20. The analysis host implemented method of claim 1, wherein the method comprises constructing a portfolio of assets based upon the index of assets (I).

21. The analysis host implemented method of claim 20, wherein the portfolio of assets comprises at least one of:
   a fund;
   a mutual fund;
   a fund of funds;
   an asset account;
   an exchange traded fund (ETF);
   a separate account;
   a pooled trust; or
   a limited partnership.

22. The analysis host implemented method according to claim 20, further comprising:
   selecting the portfolio of assets for trading according to the index of assets (I); and
   trading via at least one trading host processor one or more of said portfolio of assets based on said selecting or said weighting of the constituent index assets (IA) of the index of assets (I).

23. The analysis host implemented method according to claim 22, wherein said trading comprises: rebalancing the portfolio of assets based on the index of assets (I).

24. The analysis host implemented method according to claim 23, wherein said rebalancing is performed on a periodic basis.

25. The analysis host implemented method according to claim 23, wherein said rebalancing is based upon the constituent index assets (IA) crossing a threshold value.

26. The analysis host implemented method according to claim 22, further comprising: applying one or more rules associated with the index of assets (I).

27. The analysis host implemented method according to claim 1, wherein the method of constructing the index is used for at least one of: investment management; or investment portfolio benchmarking.

28. The analysis host implemented method of claim 1, wherein the method further comprises an enhanced valuation indifferent non-capitalization weighted index investing method, comprising:
   constructing a portfolio of assets in a fashion in which at least one of: holdings; performance; or characteristics, are substantially similar to the index of assets (I).

29. The analysis host implemented method according to claim 1, wherein said (a) comprises: gathering data about the plurality of entities using computerized databases.

30. The analysis host implemented method according to claim 1, wherein said objective measure of scale comprises a non-financial metric.

31. The analysis host implemented method according to claim 1, wherein the analysis host implemented method comprises at least one of: a passive investing method; an active investing method; or an enhanced type of active investing method.

32. The analysis host implemented method according to claim 1, wherein said measure of the size (SZ) of each said entity (E) corresponding to each said asset (A) comprises at least one of:
   revenue of a said entity (E) associated with said asset (A);
   gross revenue of a said entity (E) associated with said asset (A);
   profitability of a said entity (E) associated with said asset (A);
   sales of a said entity (E) associated with said asset (A);
   total sales of a said entity (E) associated with said asset (A);
   foreign sales of a said entity (E) associated with said asset (A);
   domestic sales of a said entity (E) associated with said asset (A);
   net sales of a said entity (E) associated with said asset (A);
   gross sales of a said entity (E) associated with said asset (A);
   profit margin of a said entity (E) associated with said asset (A);
   operating margin of a said entity (E) associated with said asset (A);
   retained earnings of a said entity (E) associated with said asset (A);
   earnings per share of a said entity (E) associated with said asset (A);
   book value of a said entity (E) associated with said asset (A);
   book value adjusted for inflation of a said entity (E) associated with said asset (A);
   book value adjusted for replacement cost of a said entity (E) associated with said asset (A);
   book value adjusted for liquidation value of a said entity (E) associated with said asset (A);
   dividends of a said entity (E) associated with said asset (A);
   assets of a said entity (E) associated with said asset (A);
   tangible assets of a said entity (E) associated with said asset (A);
   intangible assets of a said entity (E) associated with said asset (A);
   fixed assets of a said entity (E) associated with said asset (A);
   property of a said entity (E) associated with said asset (A);
   plant of a said entity (E) associated with said asset (A);
   equipment of a said entity (E) associated with said asset (A);
   goodwill of a said entity (E) associated with said asset (A);
   replacement value of assets of a said entity (E) associated with said asset (A);
   liquidation value of assets of a said entity (E) associated with said asset (A);
   liabilities of a said entity (E) associated with said asset (A);
   long term liabilities of a said entity (E) associated with said asset (A);
   short term liabilities of a said entity (E) associated with said asset (A);
   net worth of a said entity (E) associated with said asset (A);
   research and development expense of a said entity (E) associated with said asset (A);
   accounts receivable of a said entity (E) associated with said asset (A);
   earnings before interest and tax (EBIT) of a said entity (E) associated with said asset (A);
   earnings before interest, taxes, dividends, and amortization (EBITDA) of a said entity (E) associated with said asset (A);
   accounts payable of a said entity (E) associated with said asset (A);
   cost of goods sold (CGS) of a said entity (E) associated with said asset (A);
   debt ratio of a said entity (E) associated with said asset (A);
   budget of a said entity (E) associated with said asset (A);
   capital budget of a said entity (E) associated with said asset (A);
   cash budget of a said entity (E) associated with said asset (A);
   direct labor budget of a said entity (E) associated with said asset (A);
   factory overhead budget of a said entity (E) associated with said asset (A);
   operating budget of a said entity (E) associated with said asset (A);

sales budget of a said entity (E) associated with said asset (A);

inventory method of a said entity (E) associated with said asset (A);

type of stock offered of a said entity (E) associated with said asset (A);

liquidity of a said entity (E) associated with said asset (A);

book income of a said entity (E) associated with said asset (A);

tax income of a said entity (E) associated with said asset (A);

capitalization of earnings of a said entity (E) associated with said asset (A);

capitalization of goodwill of a said entity (E) associated with said asset (A);

capitalization of interest of a said entity (E) associated with said asset (A);

capitalization of revenue of a said entity (E) associated with said asset (A);

capital spending of a said entity (E) associated with said asset (A);

cash of a said entity (E) associated with said asset (A);

compensation of a said entity (E) associated with said asset (A);

employee turnover of a said entity (E) associated with said asset (A);

overhead costs of a said entity (E) associated with said asset (A);

credit rating of a said entity (E) associated with said asset (A);

growth rate of a said entity (E) associated with said asset (A);

tax rate of a said entity (E) associated with said asset (A);

liquidation value of entity of a said entity (E) associated with said asset (A);

capitalization of cash of a said entity (E) associated with said asset (A);

capitalization of earnings of a said entity (E) associated with said asset (A);

capitalization of revenue of a said entity (E) associated with said asset (A);

cash flow of a said entity (E) associated with said asset (A), a demographic measure of a said entity (E) associated with said asset (A);

a measure relating to a demographic attribute of a said entity (E) associated with said asset (A);

a non-financial metric of a said entity (E) associated with said asset (A);

a non-market related metric of a said entity (E) associated with said asset (A);

number of employees of a said entity (E) associated with said asset (A);

floor space of a said entity (E) associated with said asset (A); or office space of a said entity (E) associated with said asset (A); and wherein said measure of the size (SZ) of each said entity (E) corresponding to each said constituent index asset (IA) comprises at least one of:

revenue of a said entity (E) associated with said constituent index asset (IA);

gross revenue of a said entity (E) associated with said constituent index asset (IA);

profitability of a said entity (E) associated with said constituent index asset (IA);

sales of a said entity (E) associated with said constituent index asset (IA);

total sales of a said entity (E) associated with said constituent index asset (IA);

foreign sales of a said entity (E) associated with said constituent index asset (IA);

domestic sales of a said entity (E) associated with said constituent index asset (IA);

net sales of a said entity (E) associated with said constituent index asset (IA);

gross sales of a said entity (E) associated with said constituent index asset (IA);

profit margin of a said entity (E) associated with said constituent index asset (IA);

operating margin of a said entity (E) associated with said constituent index asset (IA);

retained earnings of a said entity (E) associated with said constituent index asset (IA);

earnings per share of a said entity (E) associated with said constituent index asset (IA);

book value of a said entity (E) associated with said constituent index asset (IA);

book value adjusted for inflation of a said entity (E) associated with said constituent index asset (IA);

book value adjusted for replacement cost of a said entity (E) associated with said constituent index asset (IA);

book value adjusted for liquidation value of a said entity (E) associated with said constituent index asset (IA);

dividends of a said entity (E) associated with said constituent index asset (IA);

assets of a said entity (E) associated with said constituent index asset (IA);

tangible assets of a said entity (E) associated with said constituent index asset (IA);

intangible assets of a said entity (E) associated with said constituent index asset (IA);

fixed assets of a said entity (E) associated with said constituent index asset (IA);

property of a said entity (E) associated with said constituent index asset (IA);

plant of a said entity (E) associated with said constituent index asset (IA);

equipment of a said entity (E) associated with said constituent index asset (IA);

goodwill of a said entity (E) associated with said constituent index asset (IA);

replacement value of assets of a said entity (E) associated with said constituent index asset (IA);

liquidation value of assets of a said entity (E) associated with said constituent index asset (IA);

liabilities of a said entity (E) associated with said constituent index asset (IA);

long term liabilities of a said entity (E) associated with said constituent index asset (IA);

short term liabilities of a said entity (E) associated with said constituent index asset (IA);

net worth of a said entity (E) associated with said constituent index asset (IA);

research and development expense of a said entity (E) associated with said constituent index asset (IA);

accounts receivable of a said entity (E) associated with said constituent index asset (IA);

earnings before interest and tax (EBIT) of a said entity (E) associated with said constituent index asset (IA);

earnings before interest, taxes, dividends, and amortization (EBITDA) of a said entity (E) associated with said constituent index asset (IA);

accounts payable of a said entity (E) associated with said constituent index asset (IA);

cost of goods sold (CGS) of a said entity (E) associated with said constituent index asset (IA);
debt ratio of a said entity (E) associated with said constituent index asset (IA);
budget of a said entity (E) associated with said constituent index asset (IA);
capital budget of a said entity (E) associated with said constituent index asset (IA);
cash budget of a said entity (E) associated with said constituent index asset (IA);
direct labor budget of a said entity (E) associated with said constituent index asset (IA);
factory overhead budget of a said entity (E) associated with said constituent index asset (IA);
operating budget of a said entity (E) associated with said constituent index asset (IA);
sales budget of a said entity (E) associated with said constituent index asset (IA);
inventory method of a said entity (E) associated with said constituent index asset (IA);
type of stock offered of a said entity (E) associated with said constituent index asset (IA);
liquidity of a said entity (E) associated with said constituent index asset (IA);
book income of a said entity (E) associated with said constituent index asset (IA);
tax income of a said entity (E) associated with said constituent index asset (IA);
capitalization of earnings of a said entity (E) associated with said constituent index asset (IA);
capitalization of goodwill of a said entity (E) associated with said constituent index asset (IA);
capitalization of interest of a said entity (E) associated with said constituent index asset (IA);
capitalization of revenue of a said entity (E) associated with said constituent index asset (IA);
capital spending of a said entity (E) associated with said constituent index asset (IA);
cash of a said entity (E) associated with said constituent index asset (IA);
compensation of a said entity (E) associated with said constituent index asset (IA);
employee turnover of a said entity (E) associated with said constituent index asset (IA);
overhead costs of a said entity (E) associated with said constituent index asset (IA);
credit rating of a said entity (E) associated with said constituent index asset (IA);
growth rate of a said entity (E) associated with said constituent index asset (IA);
tax rate of a said entity (E) associated with said constituent index asset (IA);
liquidation value of entity of a said entity (E) associated with said constituent index asset (IA);
capitalization of cash of a said entity (E) associated with said constituent index asset (IA);
capitalization of earnings of a said entity (E) associated with said constituent index asset (IA);
capitalization of revenue of a said entity (E) associated with said constituent index asset (IA);
cash flow of a said entity (E) associated with said constituent index asset (IA),
a demographic measure of a said entity (E) associated with said constituent index asset (IA);
a measure relating to a demographic attribute of a said entity (E) associated with said constituent index asset (IA);
a non-financial metric of a said entity (E) associated with said constituent index asset (IA);
a non-market related metric of a said entity (E) associated with said constituent index asset (IA);
number of employees of a said entity (E) associated with said constituent index asset (IA);
floor space of a said entity (E) associated with said constituent index asset (IA); or
office space of a said entity (E) associated with said constituent index asset (IA).

33. The analysis host implemented method according to claim 1, wherein at least one of: said measure of the size (SZ) of each said entity (E) corresponding to each said asset (A) comprises a future value of expected cash flow of a said entity (E) associated with said asset (A); or
said measure of the size (SZ) of each said entity (E) corresponding to each said constituent index asset (IA) comprises a future value of expected cash flow of a said entity (E) associated with said constituent index asset (IA).

34. The analysis host implemented method according to claim 1, further comprising: generating a subset of said data to obtain said plurality of said assets (A) and said plurality of said entities (E).

35. The analysis host implemented method according to claim 34, wherein said generating the subset comprises generating a sector.

36. The analysis host implemented method according to claim 34, wherein said generating the subset comprises generating a subcategory of said entities or assets, to obtain said plurality of said entities, or said plurality of said assets.

37. The analysis host implemented method according to claim 34, wherein said generating said subset of said data by the at least one analysis host processor comprises selecting based on at least one of: a metric of liquidity of said assets, or any metric of size of said entities.

38. The analysis host implemented method according to claim 37, wherein said generating said subset of said data by said selecting comprises selecting a subset of said assets or said entities at least one of, before, during, or after said selecting of said (d).

39. The analysis host implemented method according to claim 1, further comprising:
selecting a portion of at least one of said assets or said entities based on any criterion to obtain said plurality of said entities, or said plurality of said assets.

40. The analysis host implemented method according to claim 1, further comprising constructing said index further comprising at least one of:
minimizing trading costs;
minimizing turnover;
minimizing management costs;
avoiding misjudgments in selection;
avoiding following a market bubble;
taking account of classical valuation ratios;
constructing a valuation indifferent index; or
reducing portfolio volatility.

41. The computer-implemented method according to claim 1, further comprising constructing a portfolio based on an index of assets, the method comprising:
f) receiving the index of assets from an index provider, where the index provider previously constructed the index of assets and stored the index of assets on at least one analysis host,
the at least one analysis host comprising at least one processor, and a memory coupled to said at least one processor, wherein said analysis host is configured to:

access one or more databases storing and permitting retrieval of data (D) about a plurality of entities (E) and a plurality of corresponding assets (A) each issued by or having been issued by at least one of the plurality of entities (E);

receive at least one objective measure of scale (O) regarding one or more of the plurality of the assets or one or more of the plurality of the entities (E) associated with the corresponding assets (A);

retrieve one or more of the data (D) about the plurality of the entities (E) and the corresponding assets (A);

generate a subset of the data to obtain the plurality of the assets (A) or the plurality of the entities (E) based on at least one criterion;

select a selection from the plurality of the assets (A) or the entities (E) to comprise a plurality of constituent index assets (IA) comprising the index of assets (I), wherein said select comprises wherein said analysis host is configured to:

select the one or more data (D) to be a quantitative data (Q) reflecting the amount of the at least one objective measure of scale (O) associated with each of the entities, wherein the at least one objective measure of scale (O) is substantially independent of the market prices (P) of any of the assets (A) and is substantially independent of a market capitalization (MC) of any of the entities (E), wherein the at least one objective measure of scale (O) comprises a measure of size (SZ) of each the entity (E) associated with each the given asset (A), and wherein the measure of the size (SZ) of each the entity (E) corresponding to each the asset (A) comprises at least one of:

a demographic measure of a the entity (E) associated with the asset (A);

a financial metric of a the entity (E) associated with the asset (A);

a metric from information disclosures of a publicly traded entity; or a metric from information about a the entity (E) associated with the asset (A);

rank the entities (E) based upon at least one of the quantitative data (Q) associated with the at least one objective measure of scale (O) of each of the entities (E); and select the selection from the plurality of the assets (A) and the entities to comprise the plurality of constituent index assets (IA) based on the ranking; and calculate proportional weights for the index of assets to be objective measure of scale weights (OW) substantially independent of the market prices (P) of any of the assets (A) and substantially independent of a market capitalization (MC) of any of the entities (E), wherein said calculate comprises wherein said analysis host is configured to:

add the quantitative data (Q) of each of the at least one objective measure of scale (O) for all of the constituent index assets (IA) to yield a sum total quantitative data (SUMQ) for the at least one objective measure of scale (O); and determine a relative size of the quantitative data (Q) of a the at least one objective measure of scale (O) for each the constituent index asset (IA) as a proportion of the sum total quantitative data (SUMQ) for the at least one objective measure of scale (O) to yield the objective measure of scale weight (OW) of each of the constituent index assets (IA) comprising the index of assets (I), wherein the at least one objective measure of scale (O) comprises a measure of size (SZ) of each the entity (E) associated with each the given constituent index asset (IA), and wherein the measure of the size (SZ) of each the entity (E) corresponding to each the constituent index asset (IA) comprises at least one of:

a demographic measure of a the entity (E) associated with the constituent index asset (IA);

a financial metric of a the entity (E) associated with the constituent index asset (IA);

a metric from information disclosures of a publicly traded entity; or a metric from information about a the entity (E) associated with the constituent index asset (IA);

g) purchasing a portfolio of assets by at least one trading host comprising at least one processor and at least one memory coupled to said at least one processor, said portfolio of assets comprising the plurality of constituent assets of the index of assets in proportion to the constituent weights of the index of assets received; and h) altering said portfolio of assets by said at least one trading host comprising said at least one processor, when the index of assets received from the index provider changes over time, said altering comprising at least one of:

i) purchasing by said at least one trading host any new constituent assets of the index of assets over time;

ii) purchasing by said at least one trading host any additional constituent assets based on changes in the constituent weights of the constituent assets making up the index of assets over time;

iii) selling by said at least one trading host any previous constituent assets no longer components of the index of assets over time; or iv) selling by said at least one trading host any previous constituent assets necessitated by changes in the calculated weights of the index of assets over time.

42. A system for constructing an index of assets (I), comprising:

at least one analysis host comprising at least one computer processor; and at least one memory coupled to said at least one processor, wherein said analysis host is configured to:

access by the at least one processor one or more databases storing and permitting retrieval of data (D) about a plurality of entities (E) and a plurality of corresponding assets (A) each issued by or having been issued by at least one of the plurality of entities (E);

receive by the at least one processor at least one objective measure of scale (O) regarding one or more of the plurality of assets (A), or one or more of the plurality of entities (E) associated with said corresponding assets (A);

retrieve by the at least one processor one or more of said data (D) about said plurality of said entities (E) and said corresponding assets (A);

select by the at least one processor a selection from said plurality of said assets (A) or said entities (E) to comprise a plurality of constituent index assets (IA) comprising the index of assets (I), wherein said select comprises wherein said analysis host is configured to:

select by the at least one processor said one or more data (D) to be a quantitative data (Q) reflecting the amount of said at least one objective measure of scale (O) associated with each of said entities, wherein said at least one objective measure of scale (O) is substantially independent of the market prices (P) of any of said assets (A) and is substantially independent of a market capitalization (MC) of any of said entities (E), wherein said at least one objective measure of scale (O) comprises a measure of size (SZ) of each said entity (E) associated with each said given asset (A), and wherein said measure of the size (SZ) of each said entity (E) corresponding to each said asset (A) comprises at least one of:

a demographic measure of a said entity (E) associated with said asset (A);

a financial metric of a said entity (E) associated with said asset (A);

a metric from information disclosures of a publicly traded entity; or a metric from information about a said entity (E) associated with said asset (A);

rank by the at least one processor said entities (E) based upon at least one of a said quantitative data (Q) associated with the at least one objective measure of scale (O) of each of said entities (E); and select by the at least one processor said selection from said plurality of said assets (A) or said entities (E) to comprise said plurality of constituent index assets (IA) based on said ranking; and calculate by the at least one processor proportional weights for the index of assets to be objective measure of scale weights (OW) substantially independent of the market prices (P) of any of said assets (A) and substantially independent of a market capitalization (MC) of any of said entities (E), wherein said calculate comprises wherein said analysis host is configured to:

add by the at least one processor the quantitative data (Q) of each of said at least one objective measure of scale (O) for all of said constituent index assets (IA) to yield a sum total quantitative data (SUMQ) for said at least one objective measure of scale (O); and determine by the at least one processor a relative size of the quantitative data (Q) of a said at least one objective measure of scale (O) for each said constituent index asset (IA) as a proportion of said sum total quantitative data (SUMQ) for said at least one objective measure of scale (O) to yield the objective measure of scale weight (OW) of each of the constituent index assets (IA) comprising the index of assets (I), wherein said at least one objective measure of scale (O) comprises a measure of size (SZ) of each said entity (E) associated with each said given constituent index asset (IA), and wherein said measure of the size (SZ) of each said entity (E) corresponding to each said constituent index asset (IA) comprises at least one of:

a demographic measure of a said entity (E) associated with said constituent index asset (IA);

a financial metric of a said entity (E) associated with said constituent index asset (IA);

a metric from information disclosures of a publicly traded entity; or a metric from information about a said entity (E) associated with said constituent index asset (IA).

43. The system according to claim 42, wherein said measure of the size (SZ) of each said entity (E) corresponding to each said asset (A) comprises at least one of:

revenue of a said entity (E) associated with said asset (A);

gross revenue of a said entity (E) associated with said asset (A);

profitability of a said entity (E) associated, with said asset (A);

sales of a said entity (E) associated with said asset (A);

total sales of a said entity (E) associated with said asset (A);

foreign sales of a said entity (E) associated with said asset (A);

domestic sales of a said entity (E) associated with said asset (A);

net sales of a said entity (E) associated with said asset (A);

gross sales of a said entity (E) associated with said asset (A);

profit margin of a said entity (E) associated with said asset (A);

operating margin of a said entity (E) associated with said asset (A);

retained earnings of a said entity (E) associated with said asset (A);

earnings per share of a said entity (E) associated with said asset (A);

book value of a said entity (E) associated with said asset (A);

book value adjusted for inflation of a said entity (E) associated with said asset (A);

book value adjusted for replacement cost of a said entity (E) associated with said asset (A);

book value adjusted for liquidation value of a said entity (E) associated with said asset (A);

dividends of a said entity (E) associated with said asset (A);

assets of a said entity (E) associated with said asset (A);

tangible assets of a said entity (E) associated with said asset (A);

intangible assets of a said entity (E) associated with said asset (A);

fixed assets of a said entity (E) associated with said asset (A);

property of a said entity (E) associated with said asset (A);

plant of a said entity (E) associated with said asset (A);

equipment of a said entity (E) associated with said asset (A);

goodwill of a said entity (E) associated with said asset (A);

replacement value of assets of a said entity (E) associated with said asset (A);

liquidation value of assets of a said entity (E) associated with said asset (A);

liabilities of a said entity (E) associated with said asset (A);

long term liabilities of a said entity (E) associated with said asset (A);

short term liabilities of a said entity (E) associated with, said asset (A);

net worth of a said entity (E) associated with said asset (A);

research and development expense of a said entity (E) associated with said asset (A);

accounts receivable of a said entity (E) associated with said asset (A);

earnings before interest and tax (EB IT) of a said entity (E) associated with said asset (A);

earnings before interest, taxes, dividends, and amortization (EBITDA) of a said entity (E) associated with said asset (A);

accounts payable of a said entity (E) associated with said asset (A);

cost of goods sold (CGS) of a said entity (E) associated with said asset (A);
debt ratio of a said entity (E) associated with said asset (A);
budget of a said entity (E) associated with said asset (A);
capital budget of a said entity (E) associated with said asset (A);
cash budget of a said entity (E) associated with said asset (A);
direct labor budget of a said entity (E) associated with said asset (A);
factory overhead budget of a said entity (E) associated with said asset (A);
operating budget of a said entity (E) associated with said asset (A);
sales budget of a said entity (E) associated with said asset (A);
inventory method of a said entity (E) associated with said asset (A);
type of stock offered of a said entity (E) associated with said asset (A);
liquidity of a said entity (E) associated with said asset (A);
book income of a said entity (E) associated with said asset (A);
tax income of a said entity (E) associated with said asset (A);
capitalization of earnings of a said entity (E) associated with said asset (A);
capitalization of goodwill of a said entity (E) associated with said asset (A);
capitalization of interest of a said entity (E) associated with said asset (A);
capitalization of revenue of a said entity (E) associated with said asset (A);
capital spending of a said entity (E) associated with said asset (A);
cash of a said entity (E) associated with said asset (A);
compensation of a said entity (E) associated with said asset (A);
employee turnover of a said entity (E) associated with said asset (A);
overhead costs of a said entity (E) associated with said asset (A);
credit rating of a said entity (E) associated with said asset (A);
growth rate of a said entity (E) associated with said asset (A);
tax rate of a said entity (E) associated with said asset (A);
liquidation value of entity of a said entity (E) associated with said asset (A);
capitalization of cash of a said entity (E) associated with said asset (A);
capitalization of earnings of a said entity (E) associated with said asset (A);
capitalization of revenue of a said entity (E) associated with said asset (A);
cash flow of a said entity (E) associated with said asset (A),
a demographic measure of a said entity (E) associated with said asset (A);
a measure relating to a demographic attribute of a said entity (E) associated with said asset (A);
a non-financial metric of a said entity (E) associated with said asset (A);
a non-market related metric of a said entity (E) associated with said asset (A);
number of employees of a said entity (E) associated with said asset (A);
floor space of a said entity (E) associated with said asset (A); or
office space of a said entity (E) associated with said asset (A); and wherein said measure of the size (SZ) of each said entity (E) corresponding to each said constituent index asset (IA) comprises at least one of:
revenue of a said entity (E) associated with said constituent index asset (IA);
gross revenue of a said entity (E) associated with said constituent index asset (IA);
profitability of a said entity (E) associated with said constituent index asset (IA);
sales of a said entity (E) associated with said constituent index asset (IA);
total sales of a said entity (E) associated with said constituent index asset (IA);
foreign sales of a said entity (E) associated with said constituent index asset (IA);
domestic sales of a said entity (E) associated with said constituent index asset (IA);
net sales of a said entity (E) associated with said constituent index asset (IA);
gross sales of a said entity (E) associated with said constituent index asset (IA);
profit margin of a said entity (E) associated with said constituent index asset (IA);
operating margin of a said entity (E) associated with said constituent index asset (IA);
retained earnings of a said entity (E) associated with said constituent index asset (IA);
earnings per share of a said entity (E) associated with said constituent index asset (IA);
book value of a said entity (E) associated with said constituent index asset (IA);
book value adjusted for inflation of a said entity (E) associated with said constituent index asset (IA);
book value adjusted for replacement cost of a said entity (E) associated with said constituent index asset (IA);
book value adjusted for liquidation value of a said entity (E) associated with said constituent index asset (IA);
dividends of a said entity (E) associated with said constituent index asset (IA);
assets of a said entity (E) associated with said constituent index asset (IA);
tangible assets of a said entity (E) associated with said constituent index asset (IA);
intangible assets of a said entity (E) associated with said constituent index asset (IA);
fixed assets of a said entity (E) associated with said constituent index asset (IA);
property of a said entity (E) associated with said constituent index asset (IA);
plant of a said entity (E) associated with said constituent index asset (IA);
equipment of a said entity (E) associated with said constituent index asset (IA);
goodwill of a said entity (E) associated with said constituent index asset (IA);
replacement value of assets of a said entity (E) associated with said constituent index asset (IA);
liquidation value of assets of a said entity (E) associated with said constituent index asset (IA);
liabilities of a said entity (E) associated with said constituent index asset (IA);
long term liabilities of a said entity (E) associated with said constituent index asset (IA);

short term liabilities of a said entity (E) associated with said constituent index asset (IA);
net worth of a said entity (E) associated with said constituent index asset (IA);
research and development expense of a said entity (E) associated with said constituent index asset (IA);
accounts receivable of a said entity (E) associated with said constituent index asset (IA);
earnings before interest and tax (EBIT) of a said entity (E) associated with said constituent index asset (IA);
earnings before interest, taxes, dividends, and amortization (EBITDA) of a said entity (E) associated with said constituent index asset (IA);
accounts payable of a said entity (E) associated with said constituent index asset (IA);
cost of goods sold (CGS) of a said entity (E) associated with said constituent index asset (IA);
debt ratio of a said entity (E) associated with said constituent index asset (IA);
budget of a said entity (E) associated with said constituent index asset (IA);
capital budget of a said entity (E) associated with said constituent index asset (IA);
cash budget of a said entity (E) associated with said constituent index asset (IA);
direct labor budget of a said entity (E) associated with said constituent index asset (IA);
factory overhead budget of a said entity (E) associated with said constituent index asset (IA);
operating budget of a said entity (E) associated with said constituent index asset (IA);
sales budget of a said entity (E) associated with said constituent index asset (IA);
inventory method of a said entity (E) associated with said constituent index asset (IA);
type of stock offered of a said entity (E) associated with said constituent index asset (IA);
liquidity of a said entity (E) associated with said constituent index asset (IA);
book income of a said entity (E) associated with said constituent index asset (IA);
tax income of a said entity (E) associated with said constituent index asset (IA);
capitalization of earnings of a said entity (E) associated with said constituent index asset (IA);
capitalization of goodwill of a said entity (E) associated with said constituent index asset (IA);
capitalization of interest of a said entity (E) associated with said constituent index asset (IA);
capitalization of revenue of a said entity (E) associated with said constituent index asset (IA);
capital spending of a said entity (E) associated with said constituent index asset (IA);
cash of a said entity (E) associated with said constituent index asset (IA);
compensation of a said entity (E) associated with said constituent index asset (IA);
employee turnover of a said entity (E) associated with said constituent index asset (IA);
overhead costs of a said entity (E) associated with said constituent index asset (IA);
credit rating of a said entity (E) associated with said constituent index asset (IA);
growth rate of a said entity (E) associated with said constituent index asset (IA);
tax rate of a said entity (E) associated with said constituent index asset (IA);
liquidation value of entity of a said entity (E) associated with said constituent index asset (IA);
capitalization of cash of a said entity (E) associated with said constituent index asset (IA);
capitalization of earnings of a said entity (E) associated with said constituent index asset (IA);
capitalization of revenue of a said entity (E) associated with said constituent index asset (IA);
cash flow of a said entity (E) associated with said constituent index asset (IA),
a demographic measure of a said entity (E) associated with said constituent index asset (IA);
a measure relating to a demographic attribute of a said entity (E) associated with said constituent index asset (IA);
a non-financial metric of a said entity (E) associated with said constituent index asset (IA);
a non-market related metric of a said entity (E) associated with said constituent index asset (IA);
number of employees of a said entity (E) associated with said constituent index asset (IA);
floor space of a said entity (E) associated with said constituent index asset (IA); or
office space of a said entity (E) associated with said constituent index asset (IA).

44. The system according to claim 42, wherein at least one of: said measure of the size (SZ) of each said entity (E) corresponding to each said asset (A) comprises a future value of expected cash flow of a said entity (E) associated with said asset (A); or said measure of the size (SZ) of each said entity (E) corresponding to each said constituent index asset (IA) comprises a future value of expected cash flow of a said entity (E) associated with said constituent index asset (IA).

45. A computer-implemented index construction system, comprising:
at least one analysis host comprising at least one processor; and
at least one memory coupled to said at least one processor, wherein said analysis host is configured to:
access one or more databases storing and permitting retrieval of data (D) about a plurality of entities (E) and a plurality of corresponding assets (A) each issued by or having been issued by at least one of the plurality of entities (E);
receive at least one objective measure of scale (O) regarding one or more of the plurality of said assets, or one or more of the plurality of entities (E) associated with said corresponding assets (A);
retrieve one or more of said data (D) about a plurality of said entities (E) and said corresponding assets (A);
select a selection from said plurality of said assets (A) or said entities (E) to comprise a plurality of constituent index assets (IA) comprising the index of assets (I), wherein said select comprises wherein said analysis host is configured to:
select said one or more data (D) to be a quantitative data (Q) reflecting the amount of said at least one objective measure of scale (O) associated with each of said entities, wherein said at least one objective measure of scale (O) is substantially independent of the market prices (P) of any of said assets (A) and is substantially independent of a market capitalization (MC) of any of said entities (E),
wherein said at least one objective measure of scale (O) comprises a measure of size (SZ) of each said entity (E) associated with each said given asset (A), and wherein said measure of the size (SZ) of each said entity (E) corresponding to each said asset (A) comprises at least one of:
    a demographic measure of a said entity (E) associated with said asset (A);
    a financial metric of a said entity (E) associated with said asset (A);
    a metric from information disclosures of a publicly traded entity; or
    a metric from information about a said entity (E) associated with said asset (A);
rank said entities (E) based upon at least one of a said quantitative data (Q) associated with the at least one objective measure of scale (O) of each of said entities (E); and
select said selection from said plurality of said assets (A) or said entities (E) to comprise said plurality of constituent index assets (IA) based on said ranking; and
calculate proportional weights for the index of assets to be objective measure of scale weights (OW) substantially independent of the market prices (P) of any of said assets (A) and substantially independent of a market capitalization (MC) of any of said entities (E), wherein said calculate comprises wherein said analysis host is configured to:
    add the quantitative data (Q) of each of said at least one objective measure of scale (O) for all of said constituent index assets (IA) to yield a sum total quantitative data (SUMQ) for said at least one objective measure of scale (O); and
    determine a relative size of the quantitative data (Q) of a said at least one objective measure of scale (O) for each said constituent index asset (IA) as a proportion of said sum total quantitative data (SUMQ) for said at least one objective measure of scale (O) to yield the objective measure of scale weight (OW) of each of the constituent index assets (IA) comprising the index of assets (I),
wherein said at least one objective measure of scale (O) comprises a measure of size (SZ) of each said entity (E) associated with each said given constituent index asset (IA), and wherein said measure of the size (SZ) of each said entity (E) corresponding to each said constituent index asset (IA) comprises at least one of:
    a demographic measure of a said entity (E) associated with said constituent index asset (IA);
    a financial metric of a said entity (E) associated with said constituent index asset (IA);
    a metric from information disclosures of a publicly traded entity; or
    a metric from information about a said entity (E) associated with said constituent index asset (IA).

46. The computer implemented index construction system according to claim 45, further comprising:
    at least one trading host comprising at least one processor, and at least one memory coupled to said at least one processor, said at least one trading host configured to:
        select a plurality of assets for trading according to the index of assets; and
        trade one or more of said plurality of assets based on said select or said calculation of weights of the constituent index assets of the index.

47. A computer-implemented index construction system according to claim 45, wherein said measure of the size (SZ) of each said entity (E) corresponding to each said asset (A) comprises at least one of:
    revenue of a said entity (E) associated with said asset (A);
    gross revenue of a said entity (E) associated with said asset (A);
    profitability of a said entity (E) associated with said asset (A);
    sales of a said entity (E) associated with said asset (A);
    total sales of a said entity (E) associated with said asset (A);
    foreign sales of a said entity (E) associated with said asset (A);
    domestic sales of a said entity (E) associated with said asset (A);
    net sales of a said entity (E) associated with said asset (A);
    gross sales of a said entity (E) associated with said asset (A);
    profit margin of a said entity (E) associated with said asset (A);
    operating margin of a said entity (E) associated with said asset (A);
    retained earnings of a said entity (E) associated with said asset (A);
    earnings per share of a said entity (E) associated with said asset (A);
    book value of a said entity (E) associated with said asset (A);
    book value adjusted for inflation of a said entity (E) associated with said asset (A);
    book value adjusted for replacement cost of a said entity (E) associated with said asset (A);
    book value adjusted for liquidation value of a said entity (E) associated with said asset (A);
    dividends of a said entity (E) associated with said asset (A);
    assets of a said entity (E) associated with said asset (A);
    tangible assets of a said entity (E) associated with said asset (A);
    intangible assets of a said entity (E) associated with said asset (A);
    fixed assets of a said entity (E) associated with said asset (A);
    property of a said entity (E) associated with said asset (A);
    plant of a said entity (E) associated with said asset (A);
    equipment of a said entity (E) associated with said asset (A);
    goodwill of a said entity (E) associated with said asset (A);
    replacement value of assets of a said entity (E) associated with said asset (A);
    liquidation value of assets of a said entity (E) associated with said asset (A);
    liabilities of a said entity (E) associated with said asset (A);
    long term liabilities of a said entity (E) associated with said asset (A);
    short term liabilities of a said entity (E) associated with said asset (A);
    net worth of a said entity (E) associated with said asset (A);
    research and development expense of a said entity (E) associated with said asset (A);
    accounts receivable of a said entity (E) associated with said asset (A);
    earnings before interest and tax (EBIT) of a said entity (E) associated with said asset (A);
    earnings before interest, taxes, dividends, and amortization (EBITDA) of a said entity (E) associated with said asset (A);
    accounts payable of a said entity (E) associated with said asset (A);
    cost of goods sold (CGS) of a said entity (E) associated with said asset (A);
    debt ratio of a said entity (E) associated with said asset (A);
    budget of a said entity (E) associated with said asset (A);

capital budget of a said entity (E) associated with said asset (A);

cash budget of a said entity (E) associated with said asset (A);

direct labor budget of a said entity (E) associated with said asset (A);

factory overhead budget of a said entity (E) associated with said asset (A);

operating budget of a said entity (E) associated with said asset (A);

sales budget of a said entity (E) associated with said asset (A);

inventory method of a said entity (E) associated with said asset (A);

type of stock offered of a said entity (E) associated with said asset (A);

liquidity of a said entity (E) associated with said asset (A);

book income of a said entity (E) associated with said asset (A);

tax income of a said entity (E) associated with said asset (A);

capitalization of earnings of a said entity (E) associated with said asset (A);

capitalization of goodwill of a said entity (E) associated with said asset (A);

capitalization of interest of a said entity (E) associated with said asset (A);

capitalization of revenue of a said entity (E) associated with said asset (A);

capital spending of a said entity (E) associated with said asset (A);

cash of a said entity (E) associated with said asset (A);

compensation of a said entity (E) associated with said asset (A);

employee turnover of a said entity (E) associated with said asset (A);

overhead costs of a said entity (E) associated with said asset (A);

credit rating of a said entity (E) associated with said asset (A);

growth rate of a said entity (E) associated with said asset (A);

tax rate of a said entity (E) associated with said asset (A);

liquidation value of entity of a said entity (E) associated with said asset (A);

capitalization of cash of a said entity (E) associated with said asset (A);

capitalization of earnings of a said entity (E) associated with said asset (A);

capitalization of revenue of a said entity (E) associated with said asset (A);

cash flow of a said entity (E) associated with said asset (A), a demographic measure of a said entity (E) associated with said asset (A);

a measure relating to a demographic attribute of a said entity (E) associated with said asset (A);

a non-financial metric of a said entity (E) associated with said asset (A);

a non-market related metric of a said entity (E) associated with said asset (A);

number of employees of a said entity (E) associated with said asset (A);

floor space of a said entity (E) associated with said asset (A); or office space of a said entity (E) associated with said asset (A); and wherein said measure of the size (SZ) of each said entity (E) corresponding to each said constituent index asset (IA) comprises at least one of:

revenue of a said entity (E) associated with said constituent index asset (IA);

gross revenue of a said entity (E) associated with said constituent index asset (IA);

profitability of a said entity (E) associated with said constituent index asset (IA);

sales of a said entity (E) associated with said constituent index asset (IA);

total sales of a said entity (E) associated with said constituent index asset (IA);

foreign sales of a said entity (E) associated with said constituent index asset (IA);

domestic sales of a said entity (E) associated with said constituent index asset (IA);

net sales of a said entity (E) associated with said constituent index asset (IA);

gross sales of a said entity (E) associated with said constituent index asset (IA);

profit margin of a said entity (E) associated with said constituent index asset (IA);

operating margin of a said entity (E) associated with said constituent index asset (IA);

retained earnings of a said entity (E) associated with said constituent index asset (IA);

earnings per share of a said entity (E) associated with said constituent index asset (IA);

book value of a said entity (E) associated with said constituent index asset (IA);

book value adjusted for inflation of a said entity (E) associated with said constituent index asset (IA);

book value adjusted for replacement cost of a said entity (E) associated with said constituent index asset (IA);

book value adjusted for liquidation value of a said entity (E) associated with said constituent index asset (IA);

dividends of a said entity (E) associated with said constituent index asset (IA);

assets of a said entity (E) associated with said constituent index asset (IA);

tangible assets of a said entity (E) associated with said constituent index asset (IA);

intangible assets of a said entity (E) associated with said constituent index asset (IA);

fixed assets of a said entity (E) associated with said constituent index asset (IA);

property of a said entity (E) associated with said constituent index asset (IA);

plant of a said entity (E) associated with said constituent index asset (IA);

equipment of a said entity (E) associated with said constituent index asset (IA);

goodwill of a said entity (E) associated with said constituent index asset (IA);

replacement value of assets of a said entity (E) associated with said constituent index asset (IA);

liquidation value of assets of a said entity (E) associated with said constituent index asset (IA);

liabilities of a said entity (E) associated with said constituent index asset (IA);

long term liabilities of a said entity (E) associated with said constituent index asset (IA);

short term liabilities of a said entity (E) associated with said constituent index asset (IA);

net worth of a said entity (E) associated with said constituent index asset (IA);

research and development expense of a said entity (E) associated with said constituent index asset (IA);

accounts receivable of a said entity (E) associated with said constituent index asset (IA);

earnings before interest and tax (EBIT) of a said entity (E) associated with said constituent index asset (IA);

earnings before interest, taxes, dividends, and amortization (EBITDA) of a said entity (E) associated with said constituent index asset (IA);

accounts payable of a said entity (E) associated with said constituent index asset (IA);

cost of goods sold (CGS) of a said entity (E) associated with said constituent index asset (IA);

debt ratio of a said entity (E) associated with said constituent index asset (IA);

budget of a said entity (E) associated with said constituent index asset (IA);

capital budget of a said entity (E) associated with said constituent index asset (IA);

cash budget of a said entity (E) associated with said constituent index asset (IA);

direct labor budget of a said entity (E) associated with said constituent index asset (IA);

factory overhead budget of a said entity (E) associated with said constituent index asset (IA);

operating budget of a said entity (E) associated with said constituent index asset (IA);

sales budget of a said entity (E) associated with said constituent index asset (IA);

inventory method of a said entity (E) associated with said constituent index asset (IA);

type of stock offered of a said entity (E) associated with said constituent index asset (IA);

liquidity of a said entity (E) associated with said constituent index asset (IA);

book income of a said entity (E) associated with said constituent index asset (IA);

tax income of a said entity (E) associated with said constituent index asset (IA);

capitalization of earnings of a said entity (E) associated with said constituent index asset (IA);

capitalization of goodwill of a said entity (E) associated with said constituent index asset (IA);

capitalization of interest of a said entity (E) associated with said constituent index asset (IA);

capitalization of revenue of a said entity (E) associated with said constituent index asset (IA);

capital spending of a said entity (E) associated with said constituent index asset (IA);

cash of a said entity (E) associated with said constituent index asset (IA);

compensation of a said entity (E) associated with said constituent index asset (IA);

employee turnover of a said entity (E) associated with said constituent index asset (IA);

overhead costs of a said entity (E) associated with said constituent index asset (IA);

credit rating of a said entity (E) associated with said constituent index asset (IA);

growth rate of a said entity (E) associated with said constituent index asset (IA);

tax rate of a said entity (E) associated with said constituent index asset (IA);

liquidation value of entity of a said entity (E) associated with said constituent index asset (IA);

capitalization of cash of a said entity (E) associated with said constituent index asset (IA);

capitalization of earnings of a said entity (E) associated with said constituent index asset (IA);

capitalization of revenue of a said entity (E) associated with said constituent index asset (IA);

cash flow of a said entity (E) associated with said constituent index asset (IA), a demographic measure of a said entity (E) associated with said constituent index asset (IA);

a measure relating to a demographic attribute of a said entity (E) associated with said constituent index asset (IA); 1 a non-financial metric of a said entity (E) associated with said constituent index asset (IA);

a non-market related metric of a said entity (E) associated with said constituent index asset (IA);

number of employees of a said entity (E) associated with said constituent index asset (IA);

floor space of a said entity (E) associated with said constituent index asset (IA); or office space of a said entity (E) associated with said constituent index asset (IA).

48. The computer-implemented index construction system according to claim 45, wherein at least one of:

said measure of the size (SZ) of each said entity (E) corresponding to each said asset (A) comprises a future value of expected cash flow of a said entity (E) associated with said asset (A); or said measure of the size (SZ) of each said entity (E) corresponding to each said constituent index asset (IA) comprises a future value of expected cash flow of a said entity (E) associated with said constituent index asset (IA).

49. The computer-implemented index construction system according to claim 45, wherein each of said assets comprises at least one of a stock; a commodity; a futures contract; a bond; a municipal bond; a corporate bond; a mutual fund; a hedge fund; a fund of funds; an exchange traded fund (ETF); or a derivative.

50. The computer-implemented index construction system according to claim 45, wherein each of said assets comprises a stock.

51. The computer-implemented index construction system according to claim 45, wherein each of said assets comprises a commodity.

52. The computer-implemented index construction system according to claim 45, wherein each of said assets comprises a futures contract.

53. The computer-implemented index construction system according to claim 45, wherein each of said assets comprises a bond.

54. The computer-implemented index construction system according to claim 45, wherein each of said assets comprises a mutual fund.

55. The computer-implemented index construction system according to claim 45, wherein each of said assets comprises a hedge fund.

56. The computer-implemented index construction system according to claim 45, wherein each of said assets comprises a fund of funds.

57. The computer-implemented index construction system according to claim 45, wherein each of said assets comprises an exchange traded fund (ETF).

58. The computer-implemented index construction system according to claim 45, wherein each of said assets comprises a derivative.

59. The computer-implemented index construction system according to claim 45, wherein said calculate comprises wherein said analysis host is configured to perform a negative weighting on any of said assets.

60. The computer-implemented index construction system according to claim 59, wherein said analysis host is configured to perform said negative weighting comprises wherein said analysis host is configured to at least one of: establish or measure performance, for at least one of: any security; a portfolio; a hedge fund; or at least one of: a long or a short position.

61. The computer-implemented index construction system according to claim 45, wherein said objective measure of scale comprises a measure relating to at least one of an underlying attribute of one of the assets, or the entity associated with the asset.

62. The computer-implemented index construction system according to claim 45, wherein said entity comprises at least one of: a company; a municipality; a municipality issuing bonds; a country; or an issuer of the asset.

63. The computer-implemented index construction system according to claim 45, wherein said objective measure of scale comprises at least one of: a mathematical transformation of at least one objective measure of scale, or a ratio of any combination of objective measures of scale relating to said assets or said entities.

64. The computer-implemented index construction system according to claim 63, wherein said ratio of said any combination of said objective measures of scale comprises at least one of:
a current ratio,
a debt ratio,
a overhead expense as a percent of sales, or
a debt service burden ratio.

65. The computer-implemented index construction system according to claim 45, wherein said calculate comprises wherein said analysis host is configured to weight based on said objective measure of scale; wherein said objective measure of scale comprises an economic indicator.

66. The computer-implemented index construction system according to claim 45, wherein said objective measure of scale comprises a measure tied to a particular geography associated with the assets.

67. The computer-implemented index construction system according to claim 45, further comprising wherein said analysis host is configured to construct a portfolio of assets based upon the index of assets (I).

68. The computer-implemented index construction system of claim 67, wherein the portfolio of assets comprises at least one of:
a fund;
a mutual fund;
a fund of funds;
an asset account;
an exchange traded fund (ETF);
a separate account;
a pooled trust; or
a limited partnership.

69. The computer-implemented index construction system according to claim 67, further comprising wherein said analysis host is configured to:
select the portfolio of assets for trading according to the index of assets (I); and
trade via at least one trading host processor one or more of said portfolio of assets based on said selecting or said weighting of the constituent index assets (IA) of the index of assets (I).

70. The computer-implemented index construction system according to claim 69, wherein said analysis host is configured to trade comprises wherein said analysis host is configured to rebalance the portfolio of assets based on the index of assets (I).

71. The computer-implemented index construction system according to claim 70, wherein said analysis host is configured to rebalance on a periodic basis.

72. The computer-implemented index construction system according to claim 70, wherein said analysis host is configured to rebalance based upon the constituent index assets (IA) crossing a threshold value.

73. The computer-implemented index construction system according to claim 69, further comprising wherein said analysis host is configured to:
apply one or more rules associated with the index of assets (I).

74. The computer-implemented index construction system according to claim 45, wherein the index construction system is used for at least one of: investment management; or investment portfolio benchmarking.

75. The computer-implemented index construction system of claim 45, wherein the index construction system further comprises wherein said analysis host is configured to enhance valuation indifferent non-capitalization weighted index investing, comprising wherein said analysis host is configured to:
construct a portfolio of assets in a fashion in which at least one of: holdings; performance; or characteristics, are substantially similar to the index of assets (I).

76. The computer-implemented index construction system according to claim 45, wherein said access comprises wherein said analysis host is configured to: gather data about at least one of the plurality of assets or the plurality of entities using computerized databases.

77. The computer-implemented index construction system according to claim 45, wherein said objective measure of scale comprises a non-financial metric.

78. The computer-implemented index construction system according to claim 45, wherein the system comprises at least one of: a passive investing system; an active investing system; or an enhanced type of active investing system.

79. The computer-implemented index construction system according to claim 45, further comprising wherein said analysis host is configured to:
generate a subset of said data to obtain said plurality of said assets (A) and said plurality of said entities (E).

80. The computer-implemented index construction system according to claim 79, wherein said analysis host is configured to generate the subset comprises wherein said analysis host is configured to generate a sector.

81. The computer-implemented index construction system according to claim 79, wherein said analysis host is configured to generate the subset comprises wherein said analysis host is configured to generate a subcategory.

82. The computer-implemented index construction system according to claim 45, further comprising wherein said analysis host is configured to:
select a portion of at least one of said assets or said entities based on any criterion to obtain said plurality of said entities or said plurality of said assets.

83. The computer-implemented index construction system according to claim 45, further comprising wherein said analysis host is configured to construct said index further comprising wherein said analysis host is configured to at least one of:
minimize trading costs;
minimize turnover;
minimize management costs;
avoid misjudgments in selection;

avoid following a market bubble;
take account of classical valuation ratios;
construct a valuation indifferent index; or
reduce portfolio volatility.

84. The system according to claim 45, wherein said analysis host is configured to select comprises wherein said analysis host is configured to select based on at least one of a liquidity of said assets or any metric of size of said entities.

85. A computer program product embodied on a machine readable storage medium that provides instructions which when executed by at least one analysis host processor, causes said at least one analysis host processor to perform operations comprising a method of constructing an index of assets, the method comprising:
   (a) accessing by the at least one analysis host processor of one or more databases storing and permitting retrieval of data (D) about a plurality of entities (E) and a plurality of corresponding assets (A) each issued by or having been issued by at least one of the plurality of entities (E);
   (b) receiving by the at least one analysis host processor at least one objective measure of scale (O) regarding one or more of the plurality of said assets, or one or more of the plurality of entities (E) associated with said corresponding assets (A);
   (c) retrieving by the at least one analysis host processor one or more of said data (D) about said plurality of said entities (E) and said corresponding assets (A);
   (d) selecting by the at least one analysis host processor a selection from said plurality of said assets (A) or said entities (E) to comprise a plurality of constituent index assets (IA) comprising the index of assets (I), wherein said selecting comprises:
      (i) selecting by the at least one analysis host processor said one or more data (D) to be a quantitative data (Q) reflecting the amount of said at least one objective measure of scale (O) associated with each of said entities, wherein said at least one objective measure of scale (O) is substantially independent of the market prices (P) of any of said assets (A) and is substantially independent of a market capitalization (MC) of any of said entities (E),
      wherein said at least one objective measure of scale (O) comprises a measure of size (SZ) of each said entity (E) associated with each said given asset (A), and wherein said measure of the size (SZ) of each said entity (E) corresponding to each said asset (A) comprises at least one of:
         a demographic measure of a said entity (E) associated with said asset (A);
         a financial metric of a said entity (E) associated with said asset (A);
         a metric from information disclosures of a publicly traded entity; or
         a metric from information about a said entity (E) associated with said asset (A);
      (ii) ranking by the at least one analysis host processor said entities (E) based upon at least one of a said quantitative data (Q) associated with the at least one objective measure of scale (O) of each of said entities (E); and
      (iii) selecting by the at least one analysis host processor said selection from said plurality of said assets (A) or said entities (E) to comprise said plurality of constituent index assets (IA) based on said ranking; and
   (e) calculating by the at least one analysis host processor proportional weights for the index of assets to be objective measure of scale weights (OW) substantially independent of the market prices (P) of any of said assets (A) and substantially independent of a market capitalization (MC) of any of said entities (E), wherein said calculating comprises:
      (i) adding by the at least one analysis host processor the quantitative data (Q) of each of said at least one objective measure of scale (O) for all of said constituent index assets (IA) to yield a sum total quantitative data (SUMQ) for said at least one objective measure of scale (O); and
      (ii) determining by the at least one analysis host processor a relative size of the quantitative data (Q) of a said at least one objective measure of scale (O) for each said constituent index asset (IA) as a proportion of said sum total quantitative data (SUMQ) for said at least one objective measure of scale (O) to yield the objective measure of scale weight (OW) of each of the constituent index assets (IA) comprising the index of assets (I),
   wherein said at least one objective measure of scale (O) comprises a measure of size (SZ) of each said entity (E) associated with each said given constituent index asset (IA), and wherein said measure of the size (SZ) of each said entity (E) corresponding to each said constituent index asset (IA) comprises at least one of:
      a demographic measure of a said entity (E) associated with said constituent index asset (IA);
      a financial metric of a said entity (E) associated with said constituent index asset (IA);
      a metric from information disclosures of a publicly traded entity; or
      a metric from information about a said entity (E) associated with said constituent index asset (IA).

86. The computer program product embodied on a machine readable storage medium of claim 85, the method further comprising:
   selecting a plurality of assets for trading according to the index of assets; and
   trading one or more of said plurality of assets based on said selecting or said calculating of said objective measure of scale weights of the constituent index assets of the index.

87. The computer program product embodied on a machine readable storage medium according to claim 85, wherein said measure of the size (SZ) of each said entity (E) corresponding to each said asset (A) comprises at least one of:
   revenue of a said entity (E) associated with said asset (A);
   gross revenue of a said entity (E) associated with said asset (A);
   profitability of a said entity (E) associated with said asset (A);
   sales of a said entity (E) associated with said asset (A);
   total sales of a said entity (E) associated with said asset (A);
   foreign sales of a said entity (E) associated with said asset (A);
   domestic sales of a said entity (E) associated with said asset (A);
   net sales of a said entity (E) associated with said asset (A);
   gross sales of a said entity (E) associated with said asset (A);
   profit margin of a said entity (E) associated with said asset (A);
   operating margin of a said entity (E) associated with said asset (A);
   retained earnings of a said entity (E) associated with said asset (A);
   earnings per share of a said entity (E) associated with said asset (A);

book value of a said entity (E) associated with said asset (A);
book value adjusted for inflation of a said entity (E) associated with said asset (A);
book value adjusted for replacement cost of a said entity (E) associated with said asset (A);
book value adjusted for liquidation value of a said entity (E) associated with said asset (A);
dividends of a said entity (E) associated with said asset (A);
assets of a said entity (E) associated with said asset (A);
tangible assets of a said entity (E) associated with said asset (A);
intangible assets of a said entity (E) associated with said asset (A);
fixed assets of a said entity (E) associated with said asset (A);
property of a said entity (E) associated with said asset (A);
plant of a said entity (E) associated with said asset (A);
equipment of a said entity (E) associated with said asset (A);
goodwill of a said entity (E) associated with said asset (A);
replacement value of assets of a said entity (E) associated with said asset (A);
liquidation value of assets of a said entity (E) associated with said asset (A);
liabilities of a said entity (E) associated with said asset (A);
long term liabilities of a said entity (E) associated with said asset (A);
short term liabilities of a said entity (E) associated with said asset (A);
net worth of a said entity (E) associated with said asset (A);
research and development expense of a said entity (E) associated with said asset (A);
accounts receivable of a said entity (E) associated with said asset (A);
earnings before interest and tax (EBIT) of a said entity (E) associated with said asset (A);
earnings before interest, taxes, dividends, and amortization (EBITDA) of a said entity (E) associated with said asset (A);
accounts payable of a said entity (E) associated with said asset (A);
cost of goods sold (CGS) of a said entity (E) associated with said asset (A);
debt ratio of a said entity (E) associated with said asset (A);
budget of a said entity (E) associated with said asset (A);
capital budget of a said entity (E) associated with said asset (A);
cash budget of a said entity (E) associated with said asset (A);
direct labor budget of a said entity (E) associated with said asset (A);
factory overhead budget of a said entity (E) associated with said asset (A);
operating budget of a said entity (E) associated with said asset (A);
sales budget of a said entity (E) associated with said asset (A);
inventory method of a said entity (E) associated with said asset (A);
type of stock offered of a said entity (E) associated with said asset (A);
liquidity of a said entity (E) associated with said asset (A);
book income of a said entity (E) associated with said asset (A);
tax income of a said entity (E) associated with said asset (A);
capitalization of earnings of a said entity (E) associated with said asset (A);
capitalization of goodwill of a said entity (E) associated with said asset (A);
capitalization of interest of a said entity (E) associated with said asset (A);
capitalization of revenue of a said entity (E) associated with said asset (A);
capital spending of a said entity (E) associated with said asset (A);
cash of a said entity (E) associated with said asset (A);
compensation of a said entity (E) associated with said asset (A);
employee turnover of a said entity (E) associated with said asset (A);
overhead costs of a said entity (E) associated with said asset (A);
credit rating of a said entity (E) associated with said asset (A);
growth rate of a said entity (E) associated with said asset (A);
tax rate of a said entity (E) associated with said asset (A);
liquidation value of entity of a said entity (E) associated with said asset (A);
capitalization of cash of a said entity (E) associated with said asset (A);
capitalization of earnings of a said entity (E) associated with said asset (A);
capitalization of revenue of a said entity (E) associated with said asset (A);
cash flow of a said entity (E) associated with said asset (A),
a demographic measure of a said entity (E) associated with said asset (A);
a measure relating to a demographic attribute of a said entity (E) associated with said asset (A);
a non-financial metric of a said entity (E) associated with said asset (A);
a non-market related metric of a said entity (E) associated with said asset (A);
number of employees of a said entity (E) associated with said asset (A);
floor space of a said entity (E) associated with said asset (A); or
office space of a said entity (E) associated with said asset (A); and
wherein said measure of the size (SZ) of each said entity (E) corresponding to each said constituent index asset (IA) comprises at least one of:
revenue of a said entity (E) associated with said constituent index asset (IA);
gross revenue of a said entity (E) associated with said constituent index asset (IA);
profitability of a said entity (E) associated with said constituent index asset (IA);
sales of a said entity (E) associated with said constituent index asset (IA);
total sales of a said entity (E) associated with said constituent index asset (IA);
foreign sales of a said entity (E) associated with said constituent index asset (IA);
domestic sales of a said entity (E) associated with said constituent index asset (IA);
net sales of a said entity (E) associated with said constituent index asset (IA);
gross sales of a said entity (E) associated with said constituent index asset (IA);

profit margin of a said entity (E) associated with said constituent index asset (IA);
operating margin of a said entity (E) associated with said constituent index asset (IA);
retained earnings of a said entity (E) associated with said constituent index asset (IA);
earnings per share of a said entity (E) associated with said constituent index asset (IA);
book value of a said entity (E) associated with said constituent index asset (IA);
book value adjusted for inflation of a said entity (E) associated with said constituent index asset (IA);
book value adjusted for replacement cost of a said entity (E) associated with said constituent index asset (IA);
book value adjusted for liquidation value of a said entity (E) associated with said constituent index asset (IA);
dividends of a said entity (E) associated with said constituent index asset (IA);
assets of a said entity (E) associated with said constituent index asset (IA);
tangible assets of a said entity (E) associated with said constituent index asset (IA);
intangible assets of a said entity (E) associated with said constituent index asset (IA);
fixed assets of a said entity (E) associated with said constituent index asset (IA);
property of a said entity (E) associated with said constituent index asset (IA);
plant of a said entity (E) associated with said constituent index asset (IA);
equipment of a said entity (E) associated with said constituent index asset (IA);
goodwill of a said entity (E) associated with said constituent index asset (IA);
replacement value of assets of a said entity (E) associated with said constituent index asset (IA);
liquidation value of assets of a said entity (E) associated with said constituent index asset (IA);
liabilities of a said entity (E) associated with said constituent index asset (IA);
long term liabilities of a said entity (E) associated with said constituent index asset (IA);
short term liabilities of a said entity (E) associated with said constituent index asset (IA);
net worth of a said entity (E) associated with said constituent index asset (IA);
research and development expense of a said entity (E) associated with said constituent index asset (IA);
accounts receivable of a said entity (E) associated with said constituent index asset (IA);
earnings before interest and tax (EBIT) of a said entity (E) associated with said constituent index asset (IA);
earnings before interest, taxes, dividends, and amortization (EBITDA) of a said entity (E) associated with said constituent index asset (IA);
accounts payable of a said entity (E) associated with said constituent index asset (IA);
cost of goods sold (CGS) of a said entity (E) associated with said constituent index asset (IA);
debt ratio of a said entity (E) associated with said constituent index asset (IA);
budget of a said entity (E) associated with said constituent index asset (IA);
capital budget of a said entity (E) associated with said constituent index asset (IA);
cash budget of a said entity (E) associated with said constituent index asset (IA);
direct labor budget of a said entity (E) associated with said constituent index asset (IA);
factory overhead budget of a said entity (E) associated with said constituent index asset (IA);
operating budget of a said entity (E) associated with said constituent index asset (IA);
sales budget of a said entity (E) associated with said constituent index asset (IA);
inventory method of a said entity (E) associated with said constituent index asset (IA);
type of stock offered of a said entity (E) associated with said constituent index asset (IA);
liquidity of a said entity (E) associated with said constituent index asset (IA);
book income of a said entity (E) associated with said constituent index asset (IA);
tax income of a said entity (E) associated with said constituent index asset (IA);
capitalization of earnings of a said entity (E) associated with said constituent index asset (IA);
capitalization of goodwill of a said entity (E) associated with said constituent index asset (IA);
capitalization of interest of a said entity (E) associated with said constituent index asset (IA);
capitalization of revenue of a said entity (E) associated with said constituent index asset (IA);
capital spending of a said entity (E) associated with said constituent index asset (IA);
cash of a said entity (E) associated with said constituent index asset (IA);
compensation of a said entity (E) associated with said constituent index asset (IA);
employee turnover of a said entity (E) associated with said constituent index asset (IA);
overhead costs of a said entity (E) associated with said constituent index asset (IA);
credit rating of a said entity (E) associated with said constituent index asset (IA);
growth rate of a said entity (E) associated with said constituent index asset (IA);
tax rate of a said entity (E) associated with said constituent index asset (IA);
liquidation value of entity of a said entity (E) associated with said constituent index asset (IA);
capitalization of cash of a said entity (E) associated with said constituent index asset (IA);
capitalization of earnings of a said entity (E) associated with said constituent index asset (IA);
capitalization of revenue of a said entity (E) associated with said constituent index asset (IA);
cash flow of a said entity (E) associated with said constituent index asset (IA),
a demographic measure of a said entity (E) associated with said constituent index asset (IA);
a measure relating to a demographic attribute of a said entity (E) associated with said constituent index asset (IA);
a non-financial metric of a said entity (E) associated with said constituent index asset (IA);
a non-market related metric of a said entity (E) associated with said constituent index asset (IA);
number of employees of a said entity (E) associated with said constituent index asset (IA);
floor space of a said entity (E) associated with said constituent index asset (IA); or
office space of a said entity (E) associated with said constituent index asset (IA).

88. The computer program product embodied on a machine readable storage medium according to claim 85, wherein at least one of:

said measure of the size (SZ) of each said entity (E) corresponding to each said asset (A) comprises a future value of expected cash flow of a said entity (E) associated with said asset (A); or said measure of the size (SZ) of each said entity (E) corresponding to each said constituent index asset (IA) comprises a future value of expected cash flow of a said entity (E) associated with said constituent index asset (IA).

* * * * *